United States Patent
Yoshizawa et al.

(10) Patent No.: US 6,363,753 B1
(45) Date of Patent: Apr. 2, 2002

(54) CURVED GLASS MANUFACTURING APPARATUS WITH IMPROVED BENDING AND CONVEYOR UNITS

(75) Inventors: Hideo Yoshizawa, Osaka; Shunji Kuramoto, Sagamihara, both of (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 09/451,040

(22) Filed: Nov. 30, 1999

(30) Foreign Application Priority Data

Dec. 3, 1998 (JP) .......................................... 10-344666
Dec. 3, 1998 (JP) .......................................... 10-344671

(51) Int. Cl.[7] ........................ C03B 23/02; C03B 23/033

(52) U.S. Cl. .............................. 65/287; 65/100; 65/101; 65/102; 65/106; 65/185; 65/245; 65/253; 65/256; 65/370.1; 198/787; 198/826; 198/827; 198/824; 198/780; 193/35 F; 193/37; 492/2; 492/6; 492/42; 492/43; 492/50

(58) Field of Search ....................... 65/100, 101, 102, 65/106, 185, 245, 253, 256, 287, 370.1; 198/787, 826, 827, 824, 780; 193/35 F, 37; 492/2, 6, 42, 43, 50

(56) References Cited

U.S. PATENT DOCUMENTS

| | | | |
|---|---|---|---|
| 1,447,648 A | * | 3/1923 | Deulin ....................... 65/370.1 |
| 1,997,442 A | * | 4/1935 | Walsh |
| 2,689,392 A | * | 9/1954 | Robertson |
| 3,807,982 A | * | 4/1974 | Claassen et al. ........... 65/370.1 |
| 3,934,996 A | | 1/1976 | Frank |
| 4,011,938 A | * | 3/1977 | Kain ........................... 198/824 |

(List continued on next page.)

FOREIGN PATENT DOCUMENTS

| | | |
|---|---|---|
| DE | 3310357 | 9/1984 |
| EP | 0133114 | 2/1985 |
| EP | 0263030 | 4/1988 |
| FR | 2604700 | 4/1988 |
| JP | SHO 54-85217 | 7/1979 |
| JP | HEI 3-150232 | 6/1991 |
| JP | HEI 3-174334 | 7/1991 |
| JP | HEI 4-275929 | 10/1992 |
| JP | 2690766 | 8/1997 |
| WO | 89/00539 | 1/1989 |
| WO | 98/55412 | 12/1998 |
| WO | 00/23386 | 4/2000 |

OTHER PUBLICATIONS

European Search Report and Annex to the European Search Report, Oct. 25, 2000.

Primary Examiner—Michael Colaianni
(74) Attorney, Agent, or Firm—Merchant & Gould P.C.

(57) ABSTRACT

A roll-forming unit of a curved glass manufacturing apparatus includes a cooperating pair of upper and lower forming roll mechanisms. Each mechanism includes a forming roll having a resilient rod covered with a cover member except opposite end portions thereof, a pair of support members rotatably supporting the opposite end portions of the resilient rod while allowing the resilient rod to tilt about said support members, a bending unit coupled with at least one of the opposite end portions of the resilient rod for applying to the one end portion an external force tending to flex the forming roll into either an upwardly arched configuration or a downwardly arched configuration, and at least one backup roller unit being in rolling engagement with the forming roll to maintain the arched configuration of the forming roll. The roll-forming unit of the foregoing construction is able to bend a heated flat glass sheet into a desired curvature without producing a slip between forming rolls and the glass sheet and is readily adaptable to the manufacture of various batches of curved glass sheets of different curvatures. A conveyor roll mechanism particularly suitable for use in combination with the roll-forming unit is also disclosed.

37 Claims, 25 Drawing Sheets

U.S. PATENT DOCUMENTS

| | | |
|---|---|---|
| 4,139,359 A | 2/1979 | Johnson et al. |
| 4,226,608 A | 10/1980 | McKelvey |
| 4,540,426 A | 9/1985 | Bocelli et al. |
| 4,556,406 A | 12/1985 | Kahle |
| 4,773,925 A | 9/1988 | Schultz |
| 4,787,504 A | 11/1988 | Schultz |
| 4,820,327 A | 4/1989 | Letemps et al. |
| 5,009,693 A | 4/1991 | Freidel et al. |
| 5,069,705 A | 12/1991 | Letemps et al. |
| 5,094,679 A | 3/1992 | Letemps et al. |
| 5,118,334 A | 6/1992 | Freidel et al. |
| 5,178,660 A * | 1/1993 | Wampler et al. ............... 65/273 |
| 5,626,642 A | 5/1997 | Letemps et al. |

* cited by examiner

FIG.15A
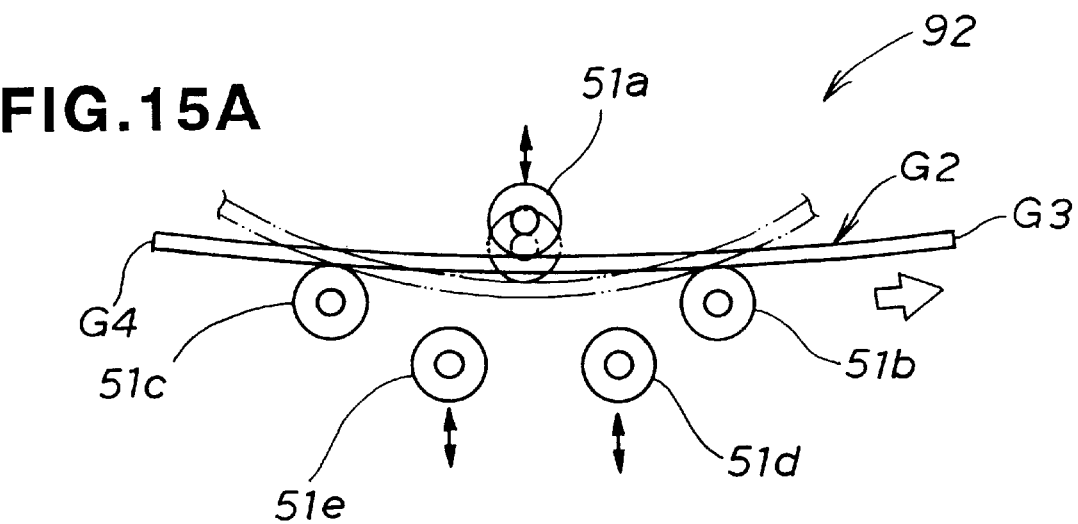
FIG.15B
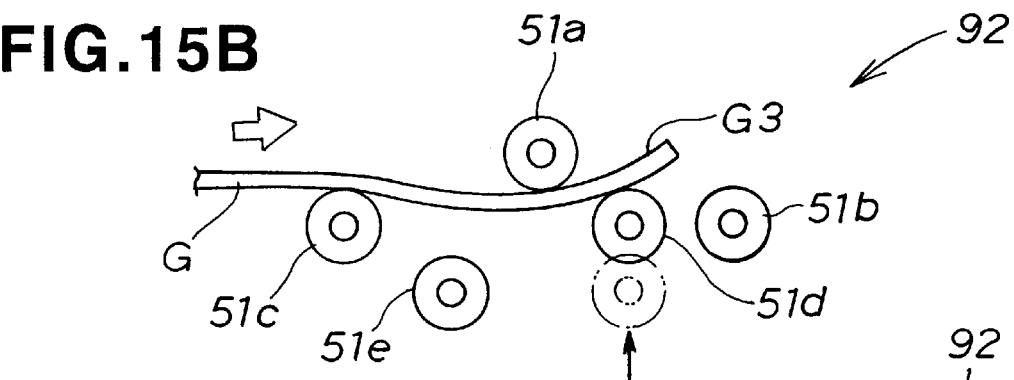
FIG.15C
FIG.15D
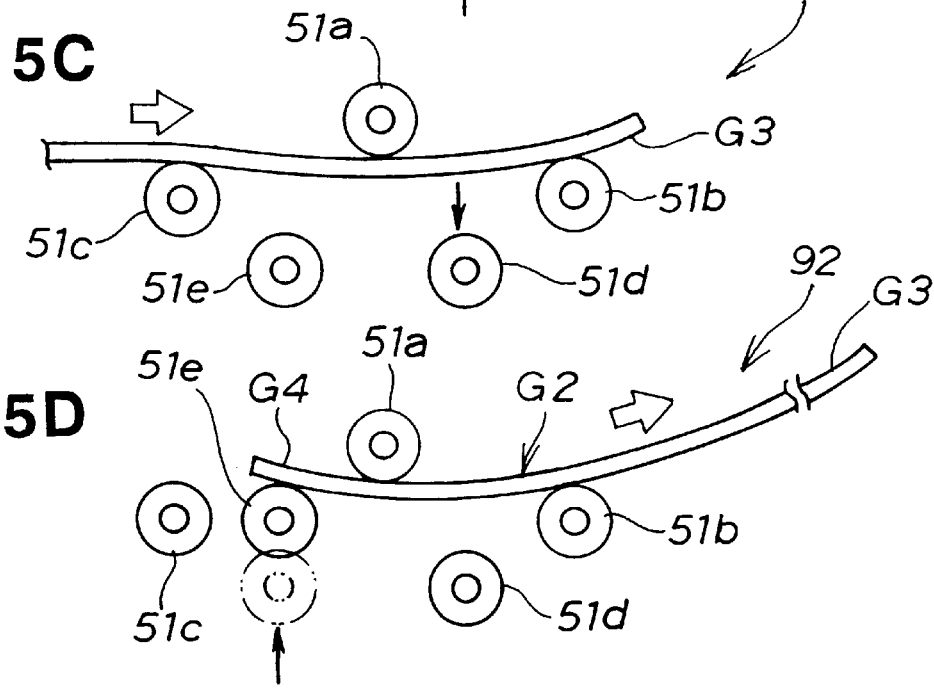

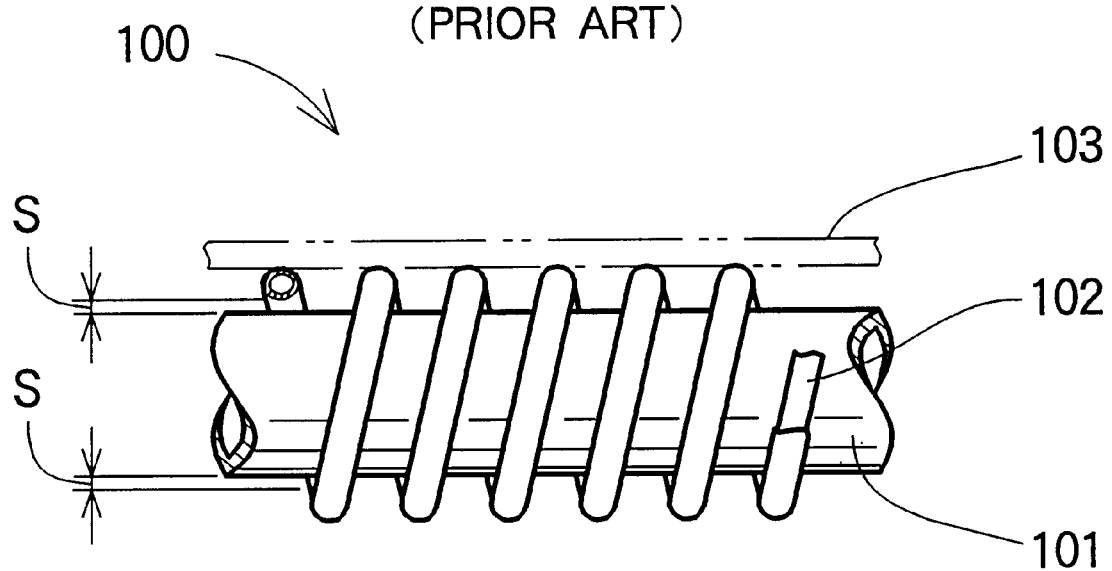

CURVED GLASS MANUFACTURING APPARATUS WITH IMPROVED BENDING AND CONVEYOR UNITS

BACKGROUND OF THE INVENTION

1. Field of the Invention

The present invention relates generally to an apparatus for manufacturing a bent or curved glass sheet, and more particularly to such a curved glass manufacturing apparatus which is equipped with improved bending and conveyor units. It also relates to a bending roll mechanism and a conveyor roll mechanism used in the bending unit and the conveyor unit, respectively.

2. Description of the Related Art

Various curved glass manufacturing apparatuses including a bending section and a conveyor system are known. Examples of such known apparatuses are disclosed in Japanese Patent Laid-open Publication No. SHO 54-85217 entitled "Method and Apparatus for Shaping Glass Sheets by Roll Forming", Japanese Patent No. 2690766 entitled "Conveyor Roll Structure", Japanese Patent Laid-open Publication No. HEI 3-150232 entitled "Method and Apparatus for Bending Glass Sheets", Japanese Patent Laid-open Publication No. HEI 3-174334 entitled "Machine and Process for Manufacturing Curved Glass Sheets", and Japanese Patent Laid-open Publication No. HEI 4-275929 entitled "Method and Apparatus for Bending Glass Sheets".

The apparatus shown in Japanese Patent Laid-open Publication No. SHO 54-85217 includes a bending section having a series of horizontally arranged upper forming rolls of convex cross-sectional shape and a series of horizontally arranged lower forming rolls of concave cross-sectional shape disposed in vertical juxtaposition so that a flat glass sheet, as it is passed between the upper and lower forming rolls, is bent into a desired curvature.

The upper and lower forming rolls are segmented so as to reduce the difference in circumferential speed between a large-diameter portion and a small-diameter portion of each forming roll.

However, since the difference in circumferential speed cannot be fully taken up or canceled by the segmented structure of the forming rolls, a mark or scar may be produced on opposite surfaces of the glass sheet due to slip occurring between the surfaces of the glass sheet and circumferential surfaces of the upper and lower forming rolls.

Additionally, since these parts of the forming rolls which correspond in position to parting lines between the adjacent segmented pieces do not contact with the surfaces of glass sheet during bending operation, the glass sheet while being bent by such forming rolls is likely to be strained or distorted.

Furthermore, due to the segmented structure, the forming rolls of the known apparatus is not easily adaptable to the manufacture of a curved glass sheet with different curvature.

Japanese Patent No. 2690766 discloses a conveyor roll which, as shown here in FIG. 25, includes a core member 101 bent into a desired curvature, and a helical coil spring member 102 rotatably wound around the core member 101. By rotating the spring member 102, glass sheets 103 which have been bent into a desired curvature are conveyed to a subsequent processing section.

To secure smooth rotation of the spring member 102 around the core member 101, a certain clearance S must be provided between the core member 101 and the spring member 102. However, especially when the core member 101 is used with a relatively small curvature, the clearance S may allow the spring member 102 to become eccentric to the core member 101, thus producing up-and-down movement or pitching of the glass sheets 103 during conveyance along a succession of such conveyor rolls 100. Due to the pitching, very small undulations are formed on opposite surfaces of the conveyed curved glass sheet, which may produce distortion or warping of image when an image is formed on such undulated surface of the curved glass sheet 103 by light either reflected from the undulated glass sheet surface or transmitted through the glass sheet 103.

Additionally, to cope with the conveyance of glass sheets of different curvatures, replacement of the core member 101 with another core member is unavoidable. This requirement may result in a considerably reduced productivity of the curved glass manufacturing apparatus.

SUMMARY OF THE INVENTION

The present invention is conceived to solve the foregoing problems associated with the prior art.

A more specific object of the present invention is to provide a curved glass manufacturing apparatus which is capable of manufacturing a curved glass sheet with high qualities and is readily adaptable to the manufacture of various curved glass sheets of different curvatures.

A further object of the present invention is to provide a curved glass manufacturing apparatus having a bending unit which is capable of bending a flat glass sheet into a desired curvature without producing a slip between forming rolls and the glass sheet and is readily adaptable to the manufacture of various curved glass sheets of different curvatures.

Another object of the present invention is to provide a curved glass manufacturing apparatus having a conveyor unit which is capable of achieving a reliable conveyance of curved glass sheets by virtue of little eccentricity of the conveyance roll and is readily adaptable to the conveyance of various curved glass sheets of different curvatures.

According to a first aspect of the present invention, there is provided a curved glass manufacturing apparatus comprising at least one roll-forming unit composed of at least one upper forming roll mechanism and at least one lower forming roll mechanism cooperating with the upper forming roll mechanism to form a heated flat glass sheet into a curved glass sheet of a desired curvature. Each of the upper and lower forming roll mechanisms includes a forming roll having a resilient rod covered with a cover member except opposite end portions thereof, a pair of support members rotatably supporting the opposite end portions of the resilient rod while allowing the resilient rod to tilt about the support members, a bending unit coupled with at least one of the opposite end portions of the resilient rod for applying to the at least one end portion an external force tending to flex the forming roll into either an upwardly arched configuration or a downwardly arched configuration, and at least one backup roller unit being in rolling engagement with the forming roll to maintain the arched configuration of the forming roll.

Each of the upper and lower forming roll mechanisms may further include a drive source coupled with the other end portion of the resilient rod to rotate the forming roll.

Preferably, the resilient rod is composed of an elongated core member of resilient material, a plurality of resilient strands laid longitudinally on a peripheral surface of the core member in close juxtaposition around the core member, and a helical coil spring wound around the resilient strands to tightly bind together the resilient strands and the core member.

The cover member may be a seamless tube having a knit structure formed of a glass fiber, ceramic fiber, metal fiber, aramid fiber or the combination thereof. Alternatively, the cover member may be a continuous tape wound around the resilient rod and having a woven structure formed of the same material as the seamless knit tube.

Preferably, the support members each include a fixed housing having a spherical hole, and a spherical segment member pivotally received in the spherical hole and rotatably supporting one of the opposite end portions of the resilient rod.

In one preferred form, the bending unit includes a tubular holder pivotally supported by one of the support members and having an axial blind hole in which the one end portion of the resilient rod is slidably and rotatably received, and an adjustment screw threaded through a closed end of the tubular holder into the axial blind hole and adapted to be turned to displace the one end portion of the resilient rod in an axial inward direction for causing the forming roll to flex in the arched configuration. The bending unit may further include a compression coil spring and a steel ball in the axial blind hole of the tubular holder and disposed between the adjustment screw and the one end portion of the resilient rod, a first spring seat disposed between the adjustment screw and one end of the compression coil spring, and a second spring seat disposed between the other end of the compression coil spring and the steel ball. The compression coil spring preferably has a resiliency greater than that of the resilient rod of the forming roll. The tubular holder is firmly fitted in the central hole of the spherical segment member of the support member.

In another preferred form, the bending unit includes a socket having a spherical hole, a spherical segment member pivotally received in the spherical hole of the socket and having a central hole in which the one end portion of the resilient rod is rotatably received, a fixed support nut having a vertically extending threaded hole, and a screw shaft threaded through the fixed support nut and having an end connected to the socket, the screw shaft being adapted to be turned to move the socket and the spherical segment member in a vertical direction for causing the resilient rod to tilt about the support members.

Preferably, the backup roller unit includes a roller holder, a pair of support rollers rotatably mounted on the roller holder in symmetric relation to one another about a vertical plane passing through an axis of the forming roll for rolling engagement with a circumferential surface of the forming roll, a fixed support nut having a vertically extending threaded hole, and a screw shaft threaded through the support nut and connected at an end to the roller holder, the screw shaft being adapted to be turned to move the support roller in vertical directions toward and away from the forming roll.

For use in the manufacture of a bidirectionally curved glass sheet having curvatures about two mutually perpendicular axes thereof, the roll-forming unit preferably includes one upper forming roll mechanism and two lower forming roll mechanisms. The respective forming rolls of the upper and lower forming roll mechanisms are arranged to match a curvature to be imparted to the heated glass sheet about an axis thereof extending orthogonally to the axes of the forming rolls. The upper forming roll mechanism may be vertically movable, and the lower forming roll mechanisms may be horizontally movable toward and away from a vertical plane along which the upper forming roll mechanism is movable. The roll-forming unit may further include two second lower forming roll mechanisms disposed between the two lower forming roll mechanisms in symmetric relation with each other about a vertical plane passing through the axis of the forming roll of the upper forming roll mechanism. The upper forming roll mechanism is movable along the vertical plane, the two lower forming roll mechanisms are fixed in position, and the two second lower forming roll mechanisms are horizontally movable toward and away from the vertical plane.

The curved glass manufacturing apparatus may further include a series of horizontally arranged conveyor roll mechanisms disposed downstream of the roll-forming unit for conveying the curved glass sheet a downstream direction. Each of the conveyor roll mechanisms comprises a conveyor roll including a resilient rod and a plurality of work supporting circular disks attached to the resilient rod at intervals along the length of the resilient rod, a pair of support members rotatably supporting opposite end portions of the resilient rod while allowing the resilient rod to tilt about the support members, and at least one bending support members acting on the resilient rod to pull or push the resilient rod in a direction orthogonal to the axis of the resilient rod to flex the resilient rod into a curvature complemental to the desired curvature of the curved glass sheet.

Preferably, the resilient rod of the conveyor roll is composed of an elongated core member of resilient material, a plurality of resilient strands laid longitudinally on a peripheral surface of the core member in close juxtaposition around the core member, and a helical coil spring wound around the resilient strands to tightly bind together the resilient strands and the core member.

Like in the forming roll mechanism, the support members of the conveyor roll mechanism each include a fixed housing having a spherical hole, and a spherical segment member pivotally received in the spherical hole and rotatably supporting one of the opposite end portions of the resilient rod.

In one preferred form, the bending support member includes a horizontal cross member extending between the support members in lateral spaced relation to the conveyor roll, a socket having a spherical hole, a spherical segment member pivotally received in the spherical hole in the socket and having a central hole in which a longitudinal portion of the resilient rod is rotatably received, a screw shaft extending vertically through the cross member and connected at one end to the socket, and first and second nuts threaded with the screw shaft on opposite sides of the cross member. The second nut is located remotely from the socket as compared to the first nut and is preferably comprised of a lock nut with handle having a wheel-like handle portion and a nut portion integral with a central portion of the handle portion. The cross member may have an oblong hole extending in a direction parallel to the axis of the resilient rod, and the screw shaft extends through the oblong hole for enabling positional adjustment of the bending support member in the longitudinal direction of the resilient rod.

In another preferred form, the bending support member includes a horizontal cross member extending between the support members in lateral spaced relation to the conveyor roll, a socket having a spherical hole, a spherical segment member pivotally received in the spherical hole in the socket and having a central hole in which a longitudinal portion of the resilient rod is rotatably received, and a turnbuckle interconnecting the socket and the cross member. The turnbuckle includes a first screw rod having a left-hand thread and connected at one end to the socket, a second screw rod having a right-hand thread, a stay pivotally connected to the cross member and firmly connected to one end of the second screw, and a sleeve having opposite ends threaded with the left-hand and right-hand threads of the first and second screw rods with the respective other ends of the first and second screw rods facing each other. Preferably, the stay is pivotally connected to the cross member by a pivot pin extending through an oblong hole formed in the cross member for enabling adjustment of the position of the bending support member in the longitudinal direction of the resilient rod.

The conveyor roll mechanism may further include a drive source coupled with one end of the resilient rod to rotate the conveyor roll.

The conveyor roll mechanisms may be arranged in pairs each composed of an upper conveyor roll mechanism and a lower conveyor roll mechanism cooperating with each other to convey the curved glass sheet while gripping the curved glass sheet between respective conveyor rolls of the upper and lower conveyor roll mechanisms.

According to a second aspect of the present invention, there is provided a forming roll mechanism for roll-forming a heated flat glass sheet into a curved glass sheet of a desired curvature. The forming roll mechanism comprises a forming roll having a resilient rod covered with a cover member except opposite end portions thereof, a pair of support members rotatably supporting the opposite end portions of the resilient rod while allowing the resilient rod to tilt about the support members, a bending unit coupled with at least one of the opposite end portions of the resilient rod for applying to the at least one end portion an external force tending to flex the forming roll into either an upwardly arched configuration or a downwardly arched configuration, and at least one backup roller unit being in rolling engagement with the forming roll to maintain the arched configuration of the forming roll.

According to a third aspect of the present invention, there is provided a conveyor roll mechanism for use in the manufacture of a curved glass sheet for conveyance of the curved glass sheet. The conveyor roll mechanism comprises a conveyor roll including a resilient rod and a plurality of work supporting circular disks attached to the resilient rod at intervals along the length of the resilient rod, a pair of support members rotatably supporting opposite end portions of the resilient rod while allowing the resilient rod to tilt about the support members, and at least one bending support members acting on the resilient rod to pull or push the resilient rod in a direction orthogonal to the axis of the resilient rod to flex the resilient rod into a curvature complemental to the desired curvature of the curved glass sheet.

The above and other objects, features and advantages of the present invention will become manifest to those versed in the art upon making reference to the following description and accompanying sheets of drawings in which preferred structural embodiments incorporating the principle of the invention are shown by way of illustrative examples.

BRIEF DESCRIPTION OF THE DRAWINGS

FIGS. 15A–15D are views similar to FIGS. 14A–14D, but showing the bidirectional bending process carried out by another modified bending section;

FIG. 25 is a fragmentary side elevational view of a conventional conveyor roll.

DETAILED DESCRIPTION OF THE PREFERRED EMBODIMENTS

Figure 1:
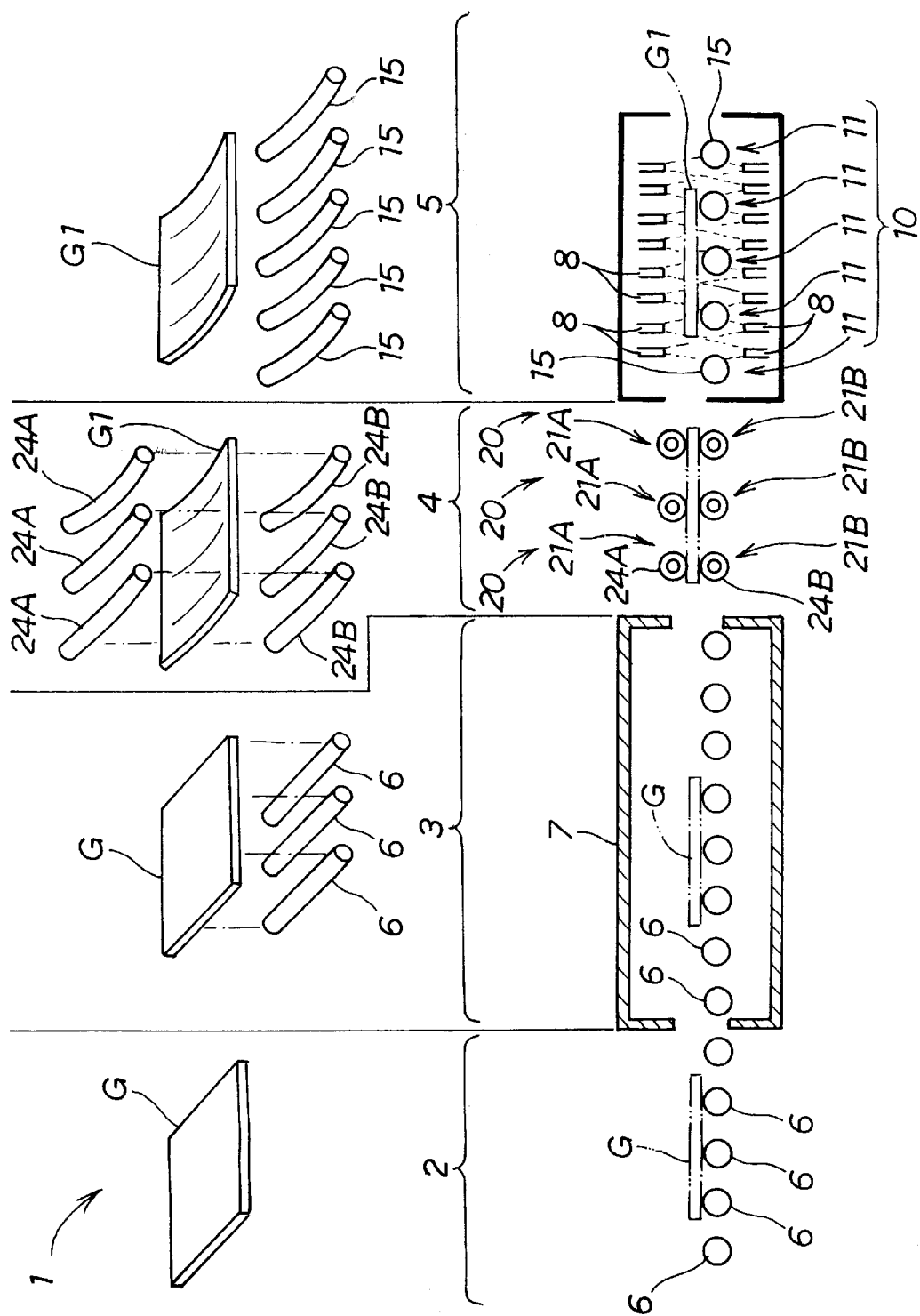
FIG. 1 is a diagrammatical view showing a unidirectional glass sheet bending process achieved by a curved glass manufacturing apparatus or line including a bending section according to one embodiment of the present invention.

Certain preferred embodiments of the present invention will be described below in greater detail with reference to the accompanying sheets of drawings wherein like or corresponding parts are designated by the same reference characters throughout several views.

Referring now to FIG. 1, there is shown the general concept of a unidirectional glass sheet bending process achieved by a curved glass manufacturing apparatus or line in which a bending section and a conveyor system according to the invention are incorporated. The term "unidirectional glass sheet bending process" used herein refers to a process for bending a flat glass sheet into a desired curvature about an axis thereof extending either parallel or orthogonal to the direction of conveyance of the glass sheet through the glass manufacturing line 1.

The curved glass manufacturing line 1 generally comprises a charging section 2, a heating section 3, a bending section 4 and a cooling section 5 with a delivery conveyor system.

The charging section 2 includes a series of longitudinally spaced, horizontally extending straight rolls 6 for charging a succession of flat glass sheets G (one being shown) into the heating section 3. The flat glass sheets G have been cut into a desired figure.

The heating section 3 includes a heating furnace 7 containing within it a succession of longitudinally spaced, horizontally extending straight rolls 6. The flat glass sheet G, as it is advanced by the rolls 6 through the heating furnace 7, is heated to a temperature at which the glass sheet G can be deformed or bent. The heated flat glass sheet G is fed into the bending section 4.

The bending section 4 includes a succession of longitudinally spaced roll-forming units 20 (three being shown) for shaping or otherwise bending the heated flat glass sheet G into a desired curvature. Each of the roll-forming units 20 is composed of a pair of upper and lower forming roll mechanisms 21A and 21B having upper and lower forming rolls 24A and 24B, respectively. In the illustrated embodiment, the upper and lower forming rolls 24A and 24B are downwardly bowed or arched, and they are rotated at the same peripheral speed, so that the flat glass sheet G, as it is passed between the upper and lower forming rolls 24A, 24B, is bent or curved about an axis thereof extending parallel to the direction of conveyance of the glass sheet G. By the bending section 4 thus arranged, the flat glass sheet G is bent or curved in the transverse direction.

The cooling section 5 includes a delivery conveyor system 10 composed of a series of longitudinally spaced conveyor roll mechanisms 11 each having a conveyor roll 15, and a plurality of sets of upper and lower cooling air-nozzles 8 each disposed between an adjacent pair of the conveyor rolls 15. The conveyor rolls 15 are downwardly bowed or arched into a curvature which is complementary to the curvature of the glass sheet G1 delivered out from the bending section 4. In the case of manufacture of a tempered glass sheet, the curved glass sheet G1, as it is conveyed on the conveyor rolls 15, is quenched by cooling air jetted from the cooling air-nozzles 8.

Figure 2:
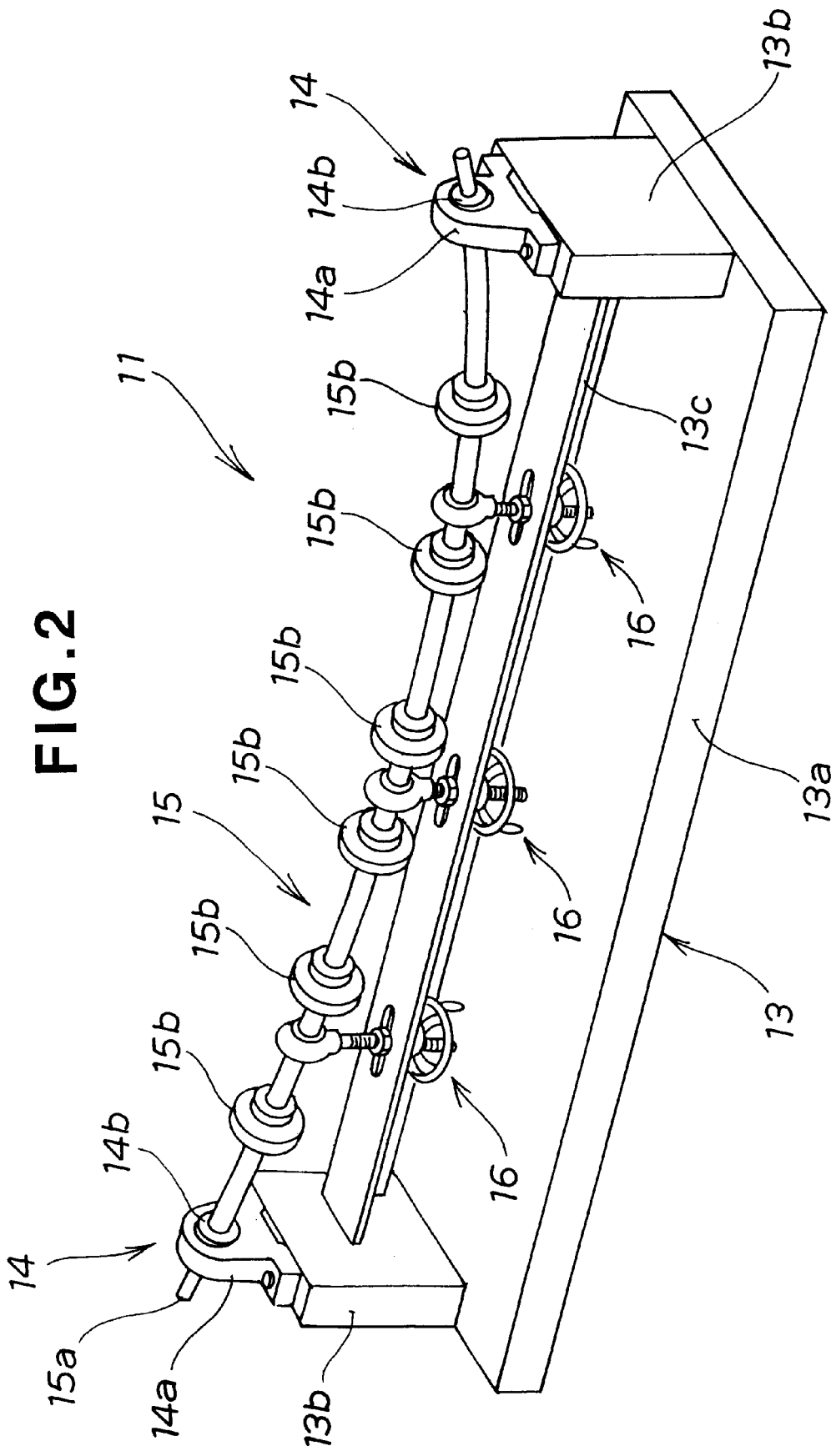
FIG. 2 is a perspective view showing a conveyor roll mechanism incorporated in the glass manufacturing line.

As shown in FIG. 2, each of the conveyor roll mechanisms 11 includes a base 13, right and left support members 14, 14 mounted on the base 13, a conveyor roll 15, and a plurality of bending support members 16. The conveyor roll 15 is supported at opposite end portions thereof by the right and left support members 14, 14 such that the conveyor roll 15 can rotate about its longitudinal axis and also can tilt about the support members 14, 14. The bending support members 16 are arranged to act between the base 13 and the conveyor roll 15 and operated to bend the conveyor roll 15 into a desired curvature. The bending support members 16 also serve to maintain the desired curvature of the conveyor roll 15 during operation of the conveyor roll mechanisms.

The base 13 is composed of an elongated horizontal base member 13a extending in the transverse direction of the glass sheet conveyance line or path, a pair of support blocks 13b, 13b mounted to opposite ends of the elongated base member 13a for supporting thereon the right and left support members 14, 14, and a cross member 13c extending between the support blocks 13b, 13b.

The support members 14, 14 each include a housing 14a mounted on the corresponding support block 13b, and a spherical segment member 14b pivotally received in a spherical hole (not designated) in the housing 14a for swivel movement relative to the housing 14a. The thus arranged support member 14 is in the form of a spherical bearing.

The conveyor roll 15 includes a resilient rod 15a and a plurality of work supporting disks 15b attached to the rod 15a at intervals along the length of the conveyor roll 15.

Figure 3:
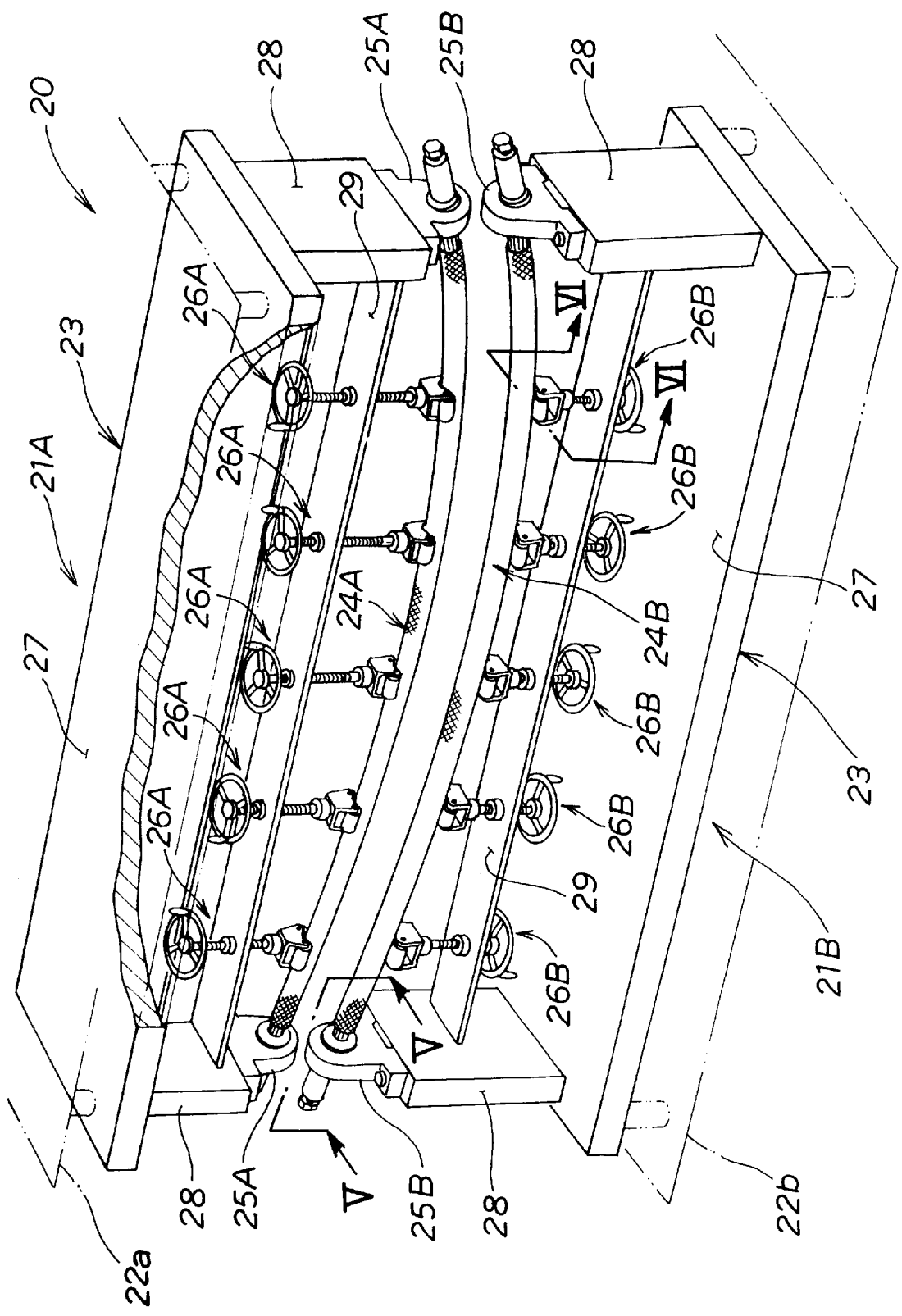
FIG. 3 is a perspective view of a roll-forming unit of the bending section of the glass manufacturing line.

As shown in FIG. 3, each of the roll-forming units 20 further includes upper and lower frame portions 22a and 22b on which the upper and lower shaping roll mechanisms 21A and 21B are supported, respectively. The upper and lower forming roll mechanisms 21A and 21B have the same construction and, hence, explanation given below is directed to the lower forming roll mechanism 21B only.

The lower forming roll mechanism 21B generally comprises a base 23, a forming roll 24B, left and right support members 25B, 25B, and a plurality of backup roller units 26B, 26B. The support members 25B, 25B are located above opposite ends of the base 23. The forming roll 24B is supported at opposite end portions thereof by the support members 25B, 25B such that the forming roll 24B can rotate about its longitudinal axis and also can tilt about the support members 25B, 25B in the same direction. The backup roll units 26B are arranged to act between the base 23 and longitudinally spaced portions of the forming roll 24B, and they are operated to either allow or force the forming roll 24B to resiliently flex into a desired curvature. The backup roll units 26B serve also as a support for maintaining the curvature of the forming roll 24B during bending operation. In FIG. 3 reference character 24A denotes a forming roll of the upper shaping roll mechanism 21A. Similarly, reference character 25A denotes left and right upper support members, and reference character 26A denotes upper backup roller units.

The base 23 is composed of an elongated horizontal base member 27 extending in the transverse direction of the glass sheet conveyance line or path, a pair of support blocks 28, 28 mounted to opposite ends of the elongated base member 27 for supporting thereon the right and left support members 25B, 25B, and a cross member 29 extending between the support blocks 28, 28.

The forming roll 24B includes a resilient rod 33 wrapped or concealed with a cover member 34 excluding opposite end portions thereof.

The resilient rod 33 is composed of a core member 33a of resilient material, a peripheral member 33b disposed on and around the peripheral surface of the core member 33, and a helically coiled spring 33c wound around the peripheral members 33b to tightly bind the core member 33a and the peripheral member 33b together. The peripheral member 33b is composed of a plurality of resilient strands arranged longitudinally of the core member 33a in close juxtaposition around the peripheral surface of the core member 33a. Thus, the rod 33 forms a composite resilient assembly which is formed jointly by the resilient core 33a, the resilient strands 33b, and the resilient coil spring 33c.

The cover member 34 has a seamless knit structure knitted with continuous threads or yarns of glass fiber, ceramic fiber, metal fiber or aramid fiber which is used either alone or in combination.

Figure 4:
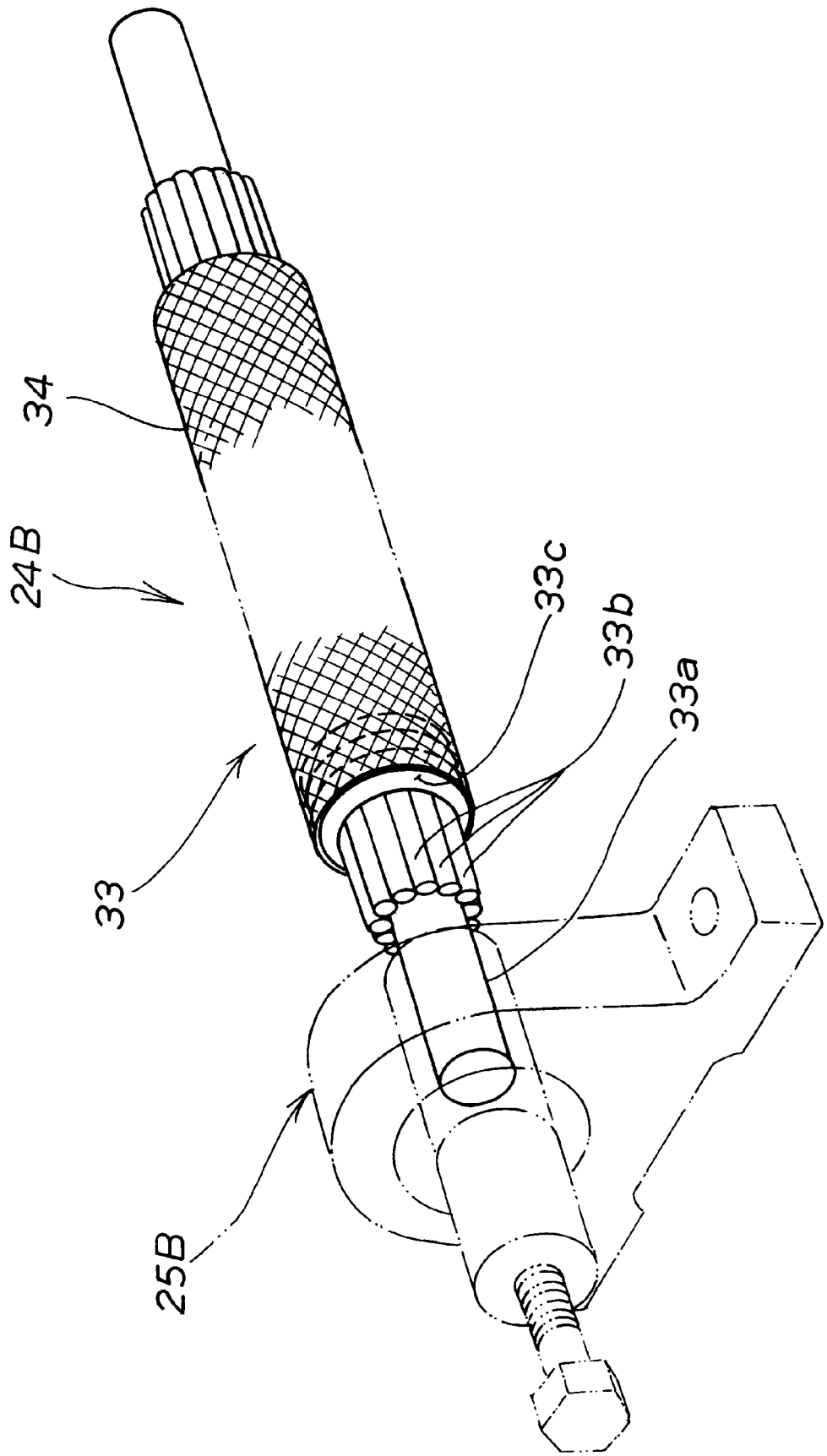
FIG. 4 is a perspective view of a lower forming roll of the roll-forming unit.

Though not shown in FIG. 4, the upper forming roll 24A (FIG. 3) has the same structure as the lower forming roll 24B.

Figure 5:
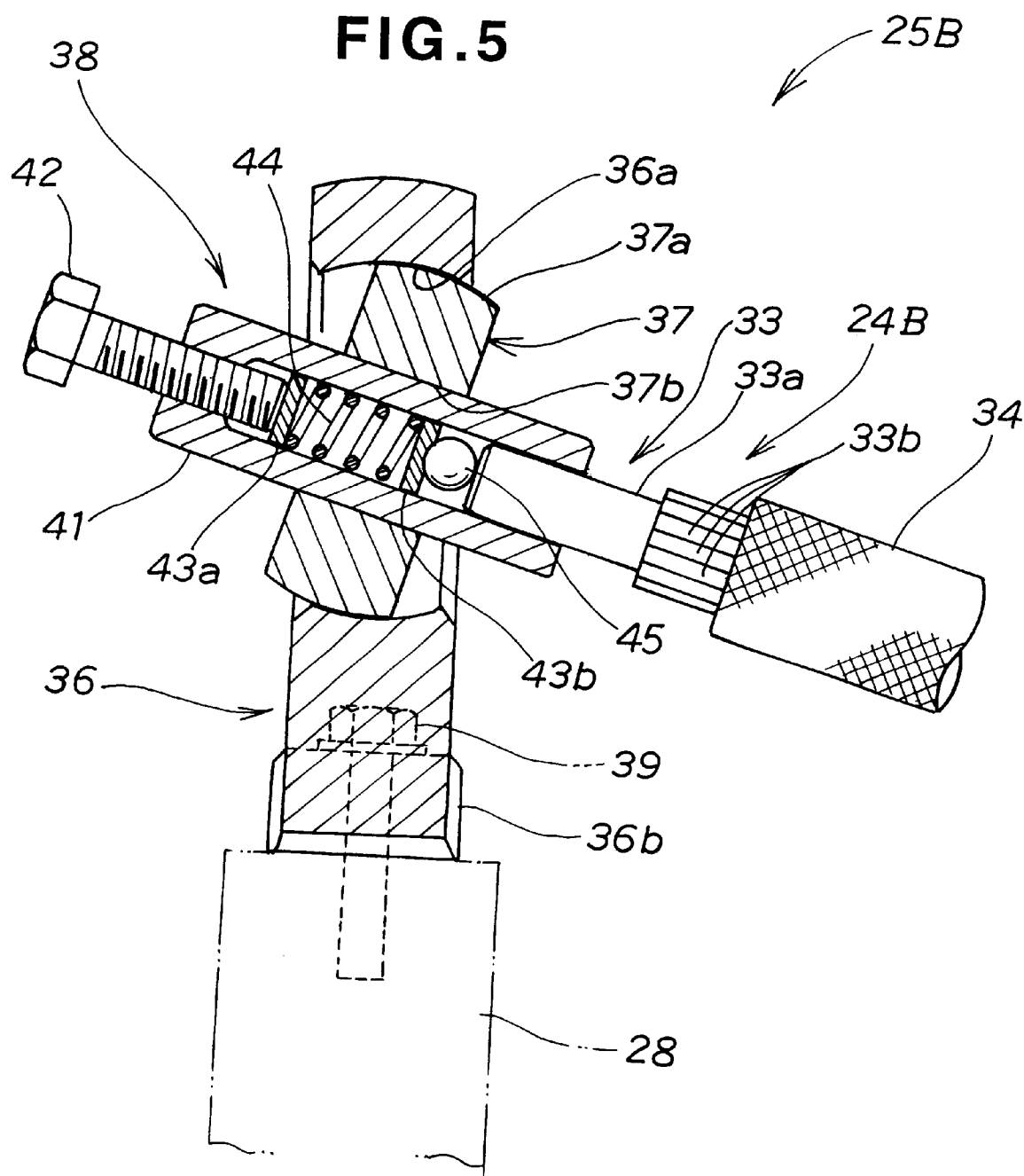
FIG. 5 is a cross-sectional view taken along line V—V of FIG. 3.

Reference is now made to FIG. 5 which shows a cross section of the support member 25B. As shown, the support member 25B includes a housing 36, a spherical segment member 37 pivotally received in the housing 36 for swivel movement relative to the housing 36, and a bending unit 38 assembled with the spherical segment member 37 for bending the forming roll 24B. The housing 36 has a pair of laterally projecting mounting bases 36b (one being shown) secured by a pair of screws 39 (one being shown), respectively, to the support block 28. The support member 25B is in the form of a spherical bearing.

Because the spherical segment member 37 is pivotally movable about a central axis of the housing 36 within a predetermined angular range, and because the rod 33 is rotatable relative to the spherical segment member 37, the support member 25B rotatably supports an end of the rod 33 while allowing the rod end to tilt about the support member 25B. The upper support members 25A shown in FIG. 3 have the same structure as the lower support members 25b described above.

As shown in FIG. 5, the bending unit 38 includes a tubular holder 41 having an axial blind hole (not designated) and firmly fitted in the central hole 37b of the segment member 37 with its closed end facing outward, an adjustment screw 42 threaded through the closed holder end into the axial blind hole of the tubular holder 41, a compression coil spring 44 received in the axial blind hole of the tubular holder 41 with a circular plate-like spring seat 43a disposed between the spring 44 and the adjustment screw 42, and a steel ball 45 received in the axial blind hole of the tubular holder 41 with another spring seat 43b disposed between the spring 44 and the ball 45. The compression coil spring 44 has a resiliency larger than that of the resilient rod 33 of the forming roll 24B. With this construction, when the adjustment screw 42 is turned in a direction to compress the compression coil spring 44, one end of the resilient rod 33 received in the tubular holder 41 is displaced in an axial inward direction (rightward direction in FIG. 5), thus forcing the resilient rod 33 to flex into an arched configuration. By virtue of this flexing, the forming roll 24B is able to assume various different arched configurations.

Figure 6:
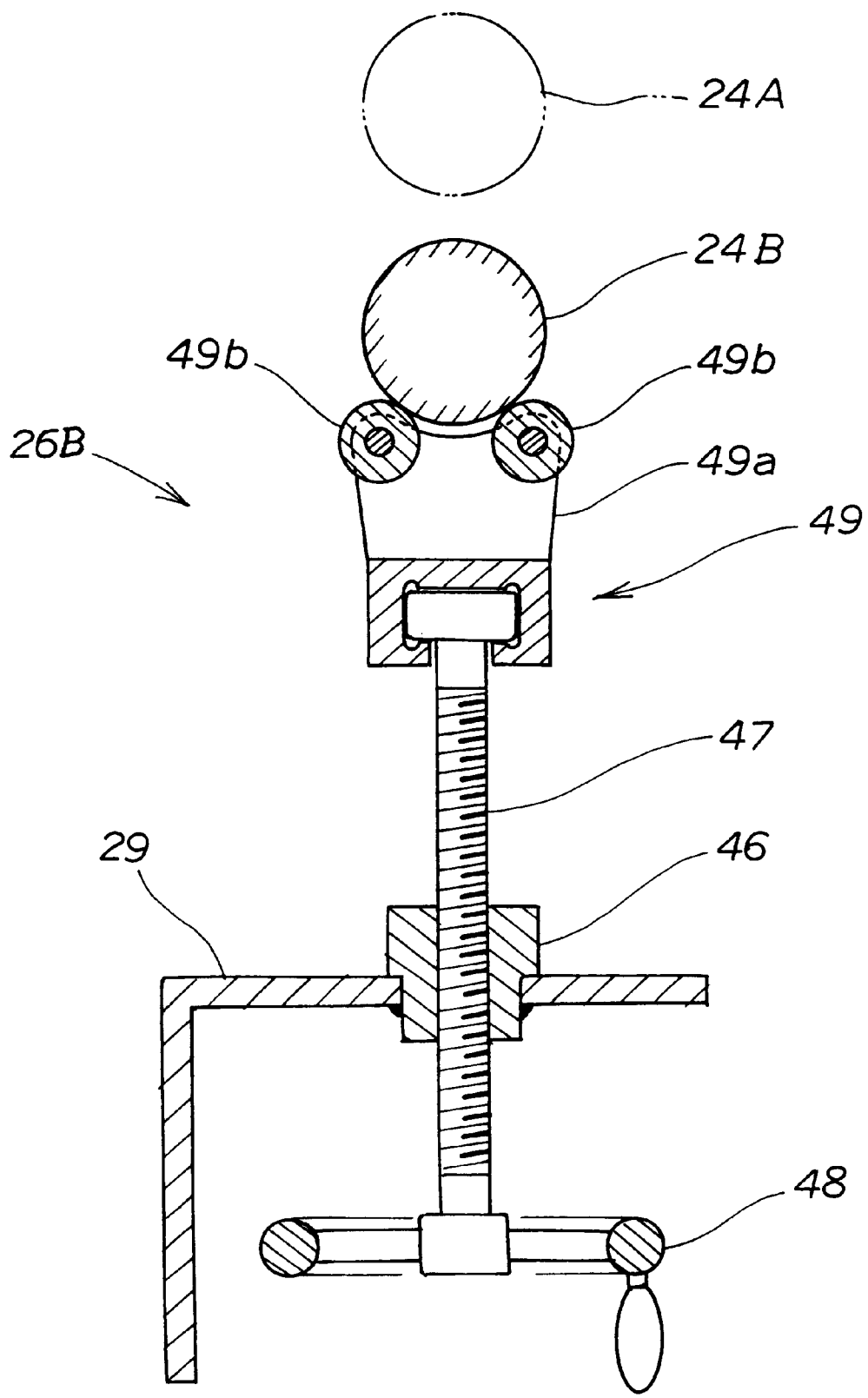
FIG. 6 is a cross-sectional view taken along line VI—VI of FIG. 3.

The backup roller units 26B each include, as shown in FIG. 6, a fixed support nut 46 attached by welding to the cross member 29 with its threaded hole extending vertically, a screw shaft 47 threaded through the support nut 26, a handle 28 attached to one end (lower end in FIG. 6) of the screw shaft 47, and a backup roller assembly 49 attached to the other end (upper end in FIG. 6) of the screw shaft 47. The backup roller assembly 49 includes a roller holder 49a connected to the upper end of the screw shaft 47, and a pair of support rollers 49b, 49b rotatably mounted on the roller holder 49a for rolling engagement with a circumferential surface of the forming roll 24B. The support rollers 49b are disposed symmetrically with respect to a vertical plane passing through the axis of the forming roll 24B. The backup units 26A shown in FIG. 3 have the same construction as the backup roller units 26B described above.

The roll-forming unit 20 of the foregoing construction operates as follows.

Figure 7A:
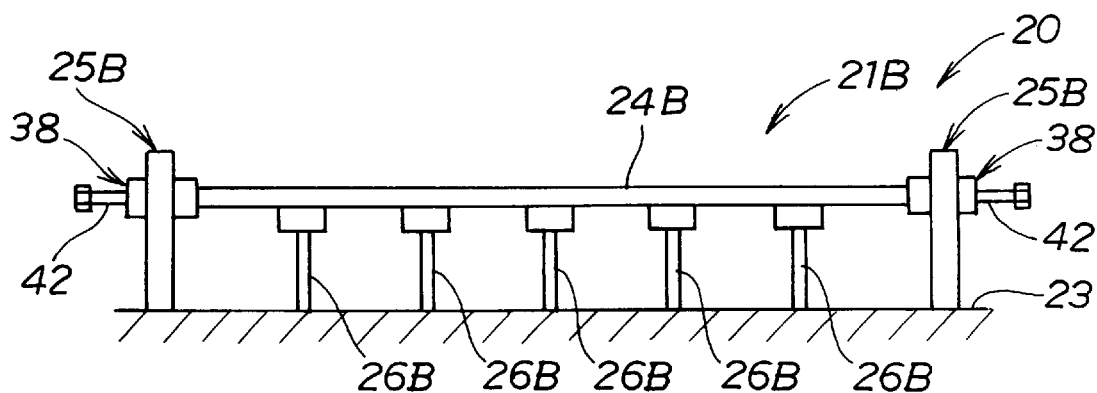
FIGS. 7A–7D are diagrammatical views illustrative of the manner in which the lower forming roll is bend into a desired curvature.
Figure 8A:
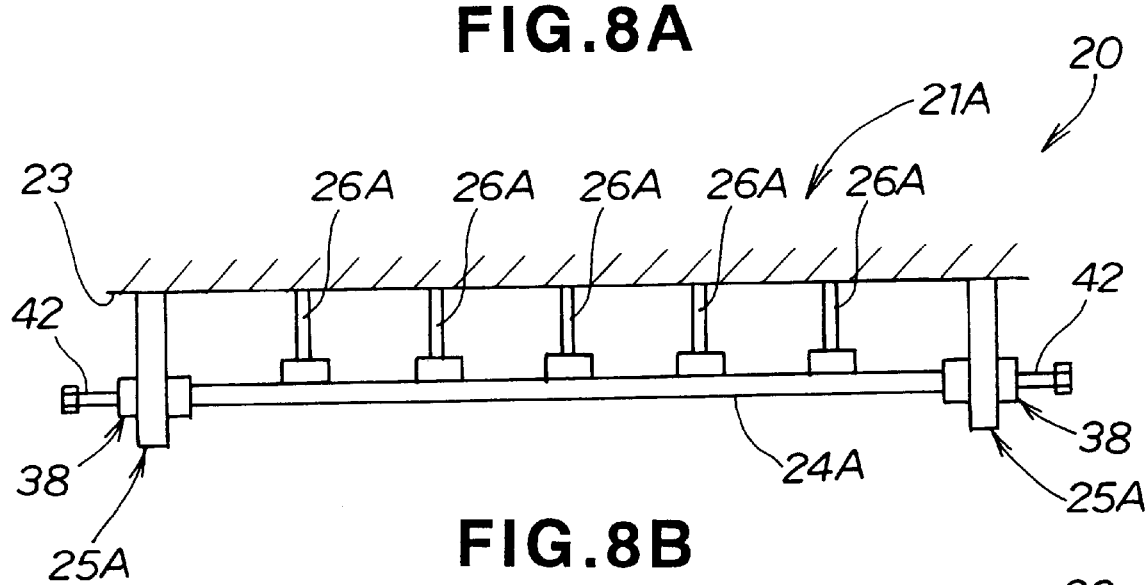
FIGS. 8A–8C are diagrammatical views illustrative of the manner in which an upper forming roll of the roll-forming unit is bend into a desired curvature.

The upper and lower forming rolls 24a, 24B of the roll-forming unit 20 have a self-supporting structure by virtue of the presence of the resilient rod 33. Accordingly, in the normal condition, each of the forming rolls 24A, 24B extends straight in a horizontal plane between the left and right support members 25A and 25A or 25B and 25B, as shown in FIGS. 7A and 8A.

Figure 7B:
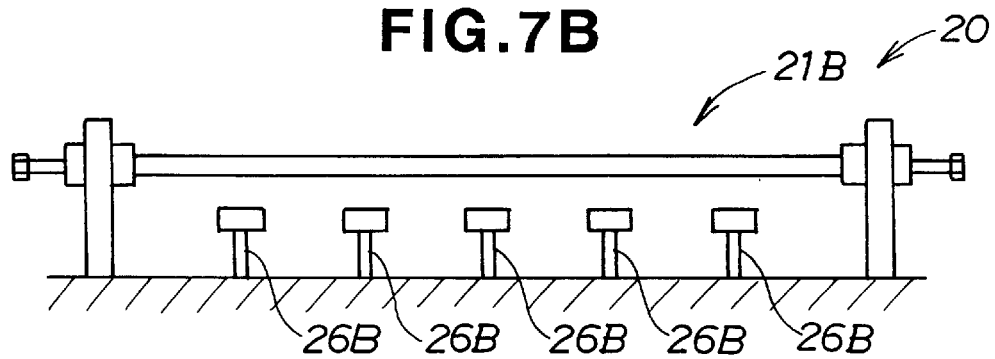

In order to allow downward flexing of the forming roll 24B, the respective handles 48 (FIG. 6) of the backup roller units 26B are turned in a direction to lower the backup roller units 26B, as show in FIG. 7B. In this instance, respective lower positions of the backup roller units 26B are set or determined such that when a desired curvature of the forming roll 24B is achieved, only the roller assembly 49 of a central one of the backup roller units 26B is in contact with the curved forming roll 24B, as will be explained below with reference to FIG. 7C.

Figure 7C:
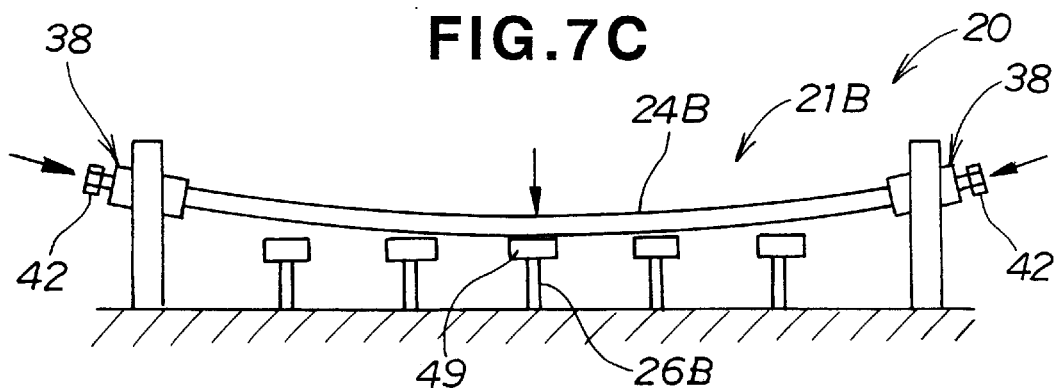

Then, while putting a load (not shown) on a longitudinal central portion of the forming roll 24B, the adjustment screws 42, 42 of the bending units 38, 38 are turned in the tightening direction to thereby force the opposite ends of the forming roll 24B in axial inward directions, as indicated by the arrows shown in FIG. 7C. The forming roll 24B, which is thus axially compressed under loaded condition, is resiliently flexed to assume a downwardly arched position in which a central portion of the downwardly flexed forming roll 24B is in contact with the roller assembly 49 of the central backup roller unit 26, as shown in FIG. 7C.

Figure 7D:
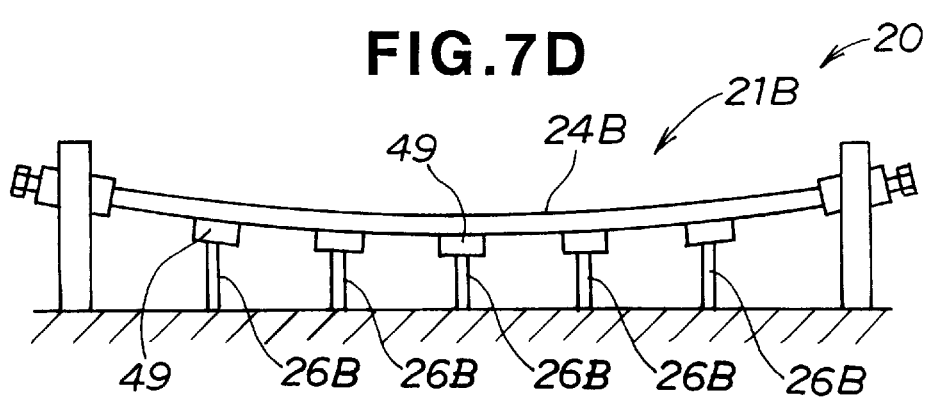

Subsequently, the remaining backup roller units 26B are moved upward until the associated roller assemblies 49 come into contact with the circumferential surface of the forming roll 24B, as shown in FIG. 7D.

Figure 8B:
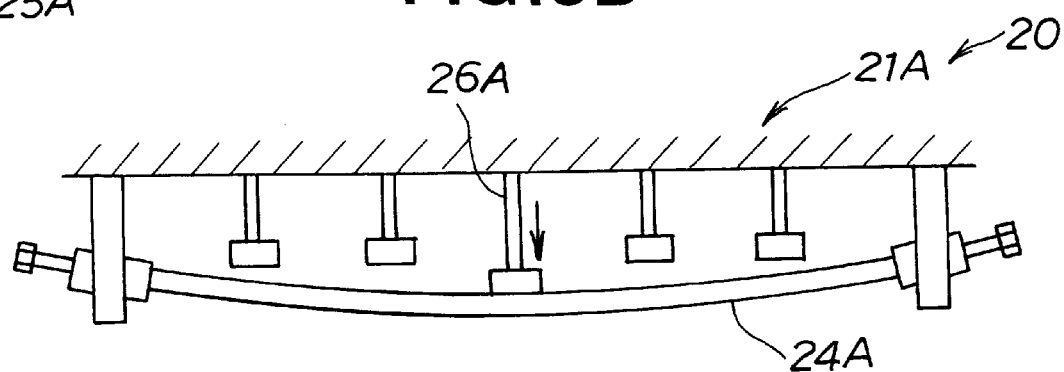
Figure 8C:
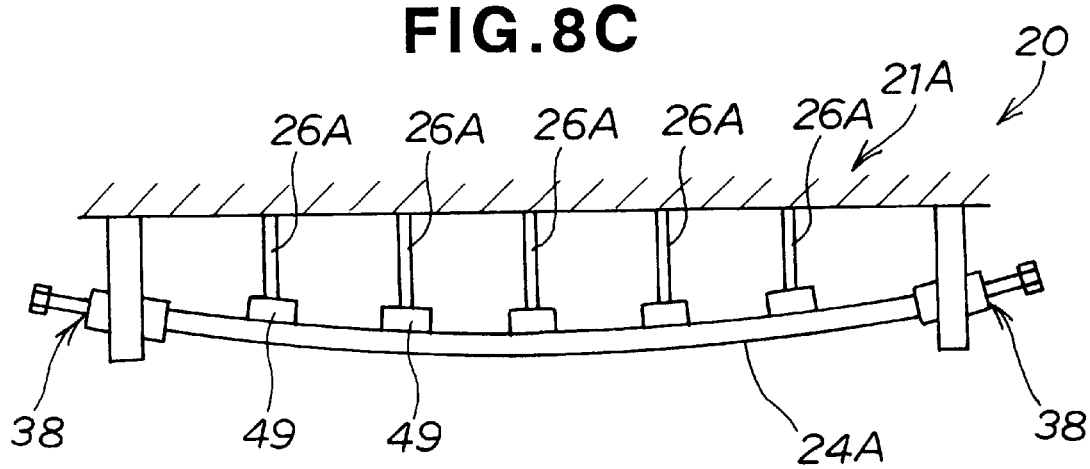

Then, a central one of the upper backup roller units 26A is lowered as indicated by the arrow shown in FIG. 8B so that the upper forming roll 24A is flexed downward against the resiliency of the forming roll 24A until a desired curvature of the forming roll 24A is achieved. In this instance, since the forming roll 24a is flexed in the same direction as the movement of the backup roller unit 26A, the desired curvature of the forming roll 24A can be obtained without using the bending units 38, 38.

Finally, the remaining backup roller units 26A are lowered until the respective roller assemblies 49 come into contact with the circumferential surface of the downwardly curved forming roll 24A.

By the setting operation previously described, the upper and lower forming rolls 24A and 24B of the forming-roll unit 20 now assume downwardly arched configurations which are complementary to a desired curvature of curved glass sheets G1 (FIG. 1) to be manufactured.

Referring back to FIG. 1, flat glass sheets G, which have been heated to a predetermined temperature above the softening point of the glass, are delivered one by one from the heating furnace 7 into the bending section 4. In the bending section 4, the flat glass sheet G is bent or curved into a desired curvature as it passes between successive pairs of upper and lower forming rolls 24A, 24B of the roll-forming units 20. A transversely bent or curved glass sheet G1 is thus produced. The curved glass sheet G1 is thereafter introduced into the cooling section 5 where the curved glass sheet G1 is quenched by blasts of cooling air issued from the air-nozzles 8 while it is conveyed downstream on the conveyor rolls 15.

Figure 9:
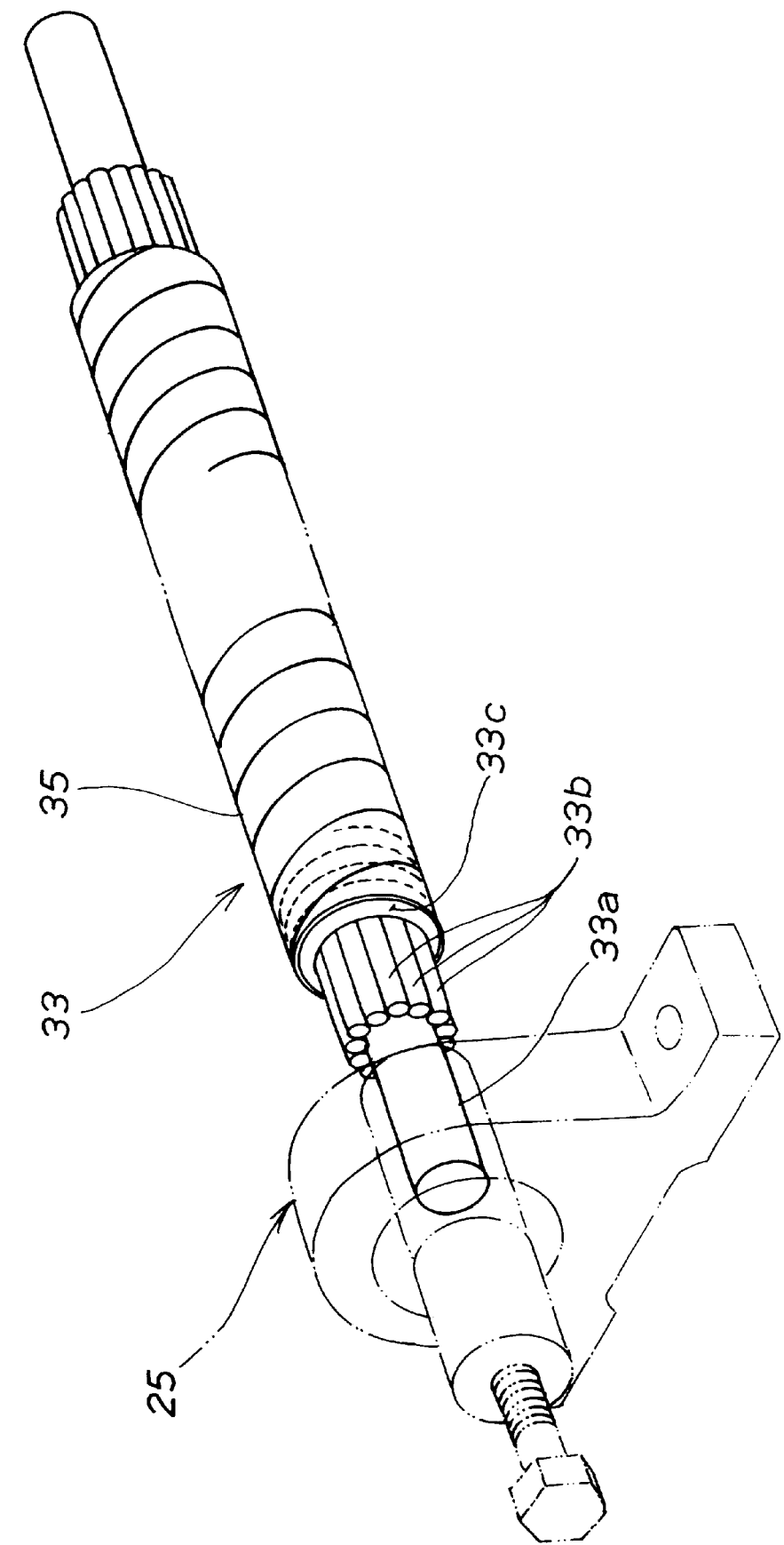
FIG. 9 is a perspective view showing a modified form of the forming roll.

FIG. 9 shows a modified form of the forming roll according to the present invention.

The modified forming roll 24C, shown as a lower forming roll, differs from the forming roll 24B (24A) of FIG. 3 in that the cover member 35 comprises a woven tape helically wound around the peripheral surface of a resilient rod 33. The woven tape cover member 35 is formed of the same material as the knitted cover member 34 shown in FIG. 4.

Figure 10:
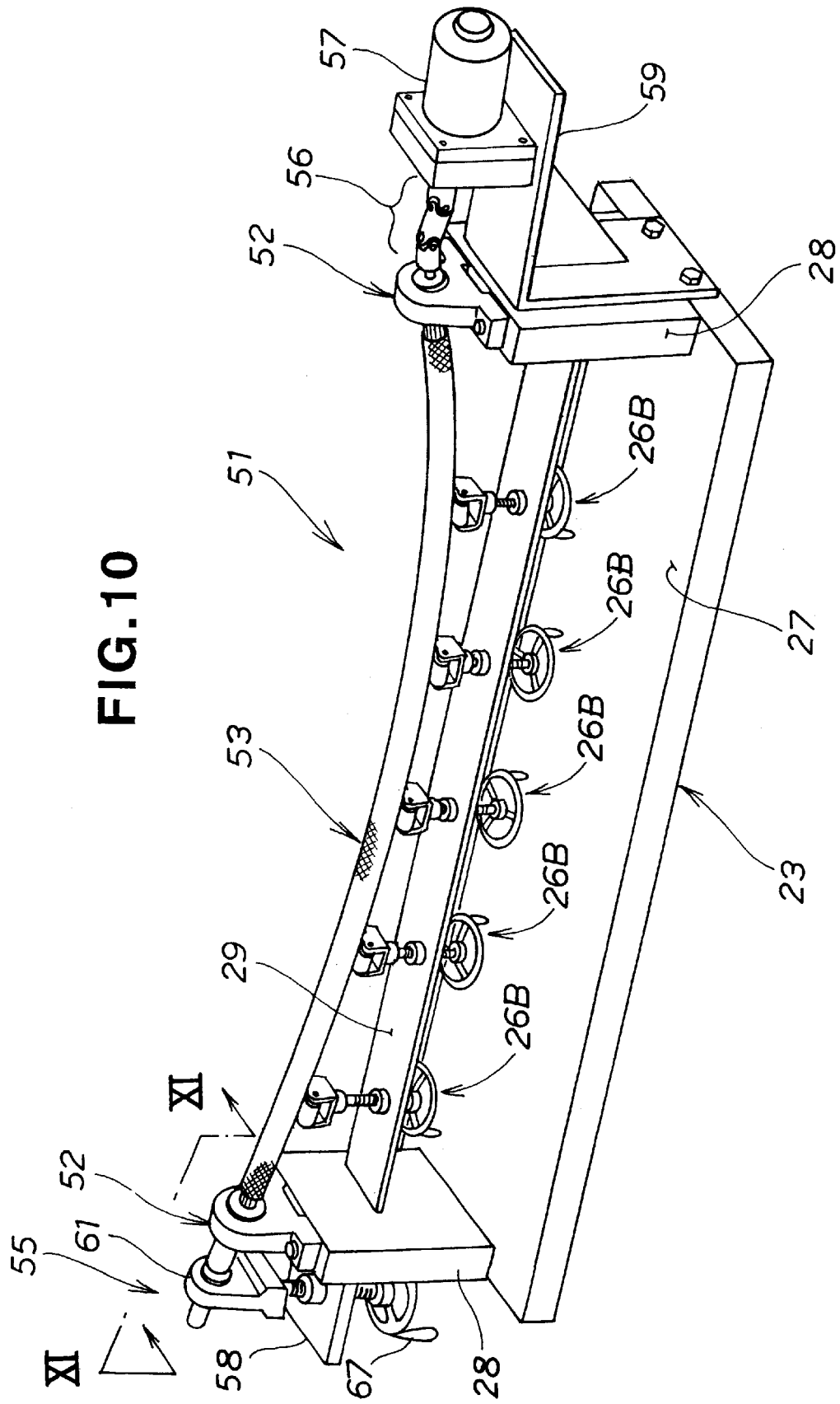
FIG. 10 is a view similar to FIG. 3, but showing a lower forming roll mechanism according to another embodiment of the present invention.

FIG. 10 shows in perspective view showing a lower forming roll mechanism 51 according to another embodiment of the present invention. In FIG. 10, these parts which are the same as those of the first embodiment shown in FIG. 3 are designated by the same reference characters, and no further explanation thereof is necessary.

The forming roll mechanism 51 includes a base 23 having an elongated rectangular base member 27, right and left support members 52, 52 mounted on opposite end portions of the base member 27 via right and left support blocks 28, 28, respectively, a forming roll 53 supported at opposite end portions by the support members 52, 52 such that the forming roll 53 is rotatable about its longitudinal axis and can tilt about a central axis of the support members 52, 52, and a plurality of backup roller units 26B acting between the base 23 and the forming roll 53 to allow or force the forming roll 53 to flex into a desired curvature. The backup roller units 26B serve also as a support for maintaining the desired curvature of the forming roll 53 during bending operation. The forming roll mechanism 51 further includes a roll bending unit 55 coupled with one end of the forming roll 53 for bending the forming roll 53 into an arched configuration, and a geared motor 57 coupled with the other end of the forming roll 53 via a universal joint 56. The forming roll 53 is substantially the same in construction as the forming roll 24B shown in FIG. 4. The geared motor 57 is attached to the base member 27 via a bracket 57. The roll bending unit 55 is mounted on a bracket 58 attached to the base member 27.

Because the geared motor (drive source) 57 for directly driving the forming roll 53 is provided as a unitary part of the forming roll mechanism 51, the forming roll mechanism 51 has a great degree of flexibility in terms of layout. The modified forming roll mechanism 51 is, therefore, particularly advantageous when a plurality of such forming roll mechanisms 51 are to be arranged in various different ways, as will be explained with reference to FIGS. 12–15.

Figure 11:
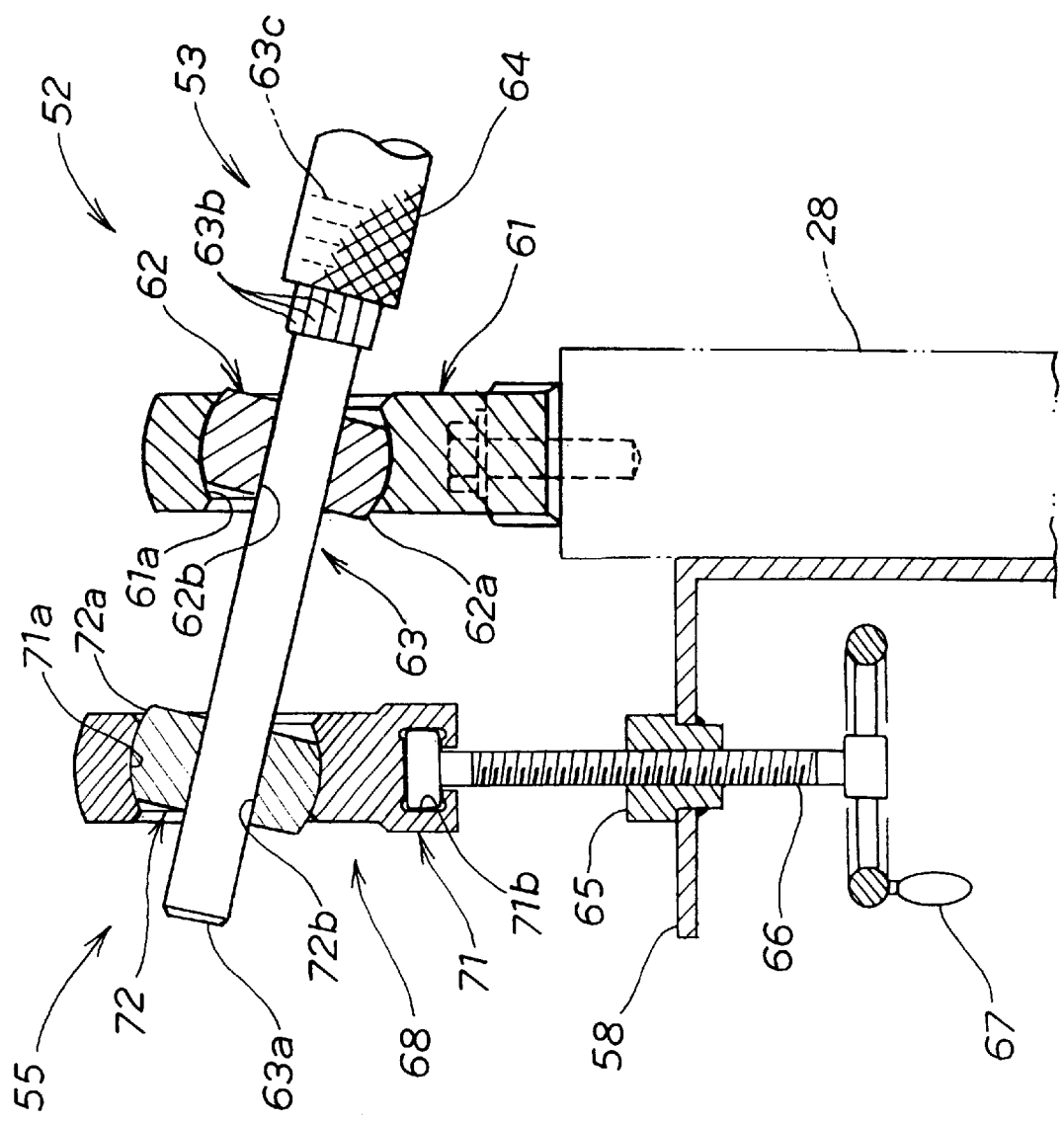
FIG. 11 is a cross-sectional view taken along line XI—XI of FIG. 10.

As shown in FIG. 11, the support members 52 each include a housing 61 having a spherical hole (not designated) and attached by screws (one being shown) to a support block 28, and a spherical segment member 62 pivotally received in the spherical hole of the housing 61 for swivel movement relative to the housing 61. The segment member 62 has a spherical outside surface 62a slidably fitted with a spherical inside surface 61a of the spherical hole of the housing 61, and a central hole 62b in which one end of the forming roll 53 is rotatably received. The support member 52 forms a spherical bearing.

The forming roll 53 is substantially the same in construction as the forming roll 24B shown in FIG. 4 and includes a resilient rod 63 composed of a core member 63a, a peripheral member 63b (composed of strands) and a helical coil spring 63c, and a cover member 64 wrapped around a circumferential surface of the rod 63 excluding opposite end portions thereof. The core member 63a is longer than the core member 33a of the forming roll 24B shown in FIG. 4 and is rotatably received in the central hole 62b of the segment member 62.

The bending unit 55, as shown in FIG. 11, includes a fixed support nut 65 attached by welding to the bracket 58 with its threaded hole extending vertically, a screw shaft 66 threaded through the support nut 65, a handle 67 attached to one end (lower end in FIG. 11) of the screw shaft 66, and a support head 68 attached to the other end (upper end in FIG. 11) of the screw shaft 66.

The support head 68 includes a housing or socket 71 having a spherical hole (not designated), and a spherical segment member 72 pivotally received in the spherical hole of the socket 71 for swivel movement relative to the socket 71 through sliding movement between a spherical inside wall 71a of the socket 71 and a spherical outside wall 72a of the segment member 72. The segment member 72 has a central hole 72b in which the core member 63a of the forming roll 64 is rotatably received.

The bending unit 55 of the foregoing construction is able to impart a desired curvature to the forming roll 53 by rotating the handle 67 in a desired direction to raise or lower the support head 68. In the illustrated embodiment, the support head 68 is moved upward so that the forming roll 53 is bent into a downwardly arched configuration. The raised or lowered position of the support head 68 is retained by threaded engagement between the screw shaft 66 and the support nut 65 so that the desired curvature of the forming roll 53 can be maintained during glass bending operation.

The forming roll mechanism 51 shown in FIG. 10 can be used in various ways as detailed below.

Figure 12:
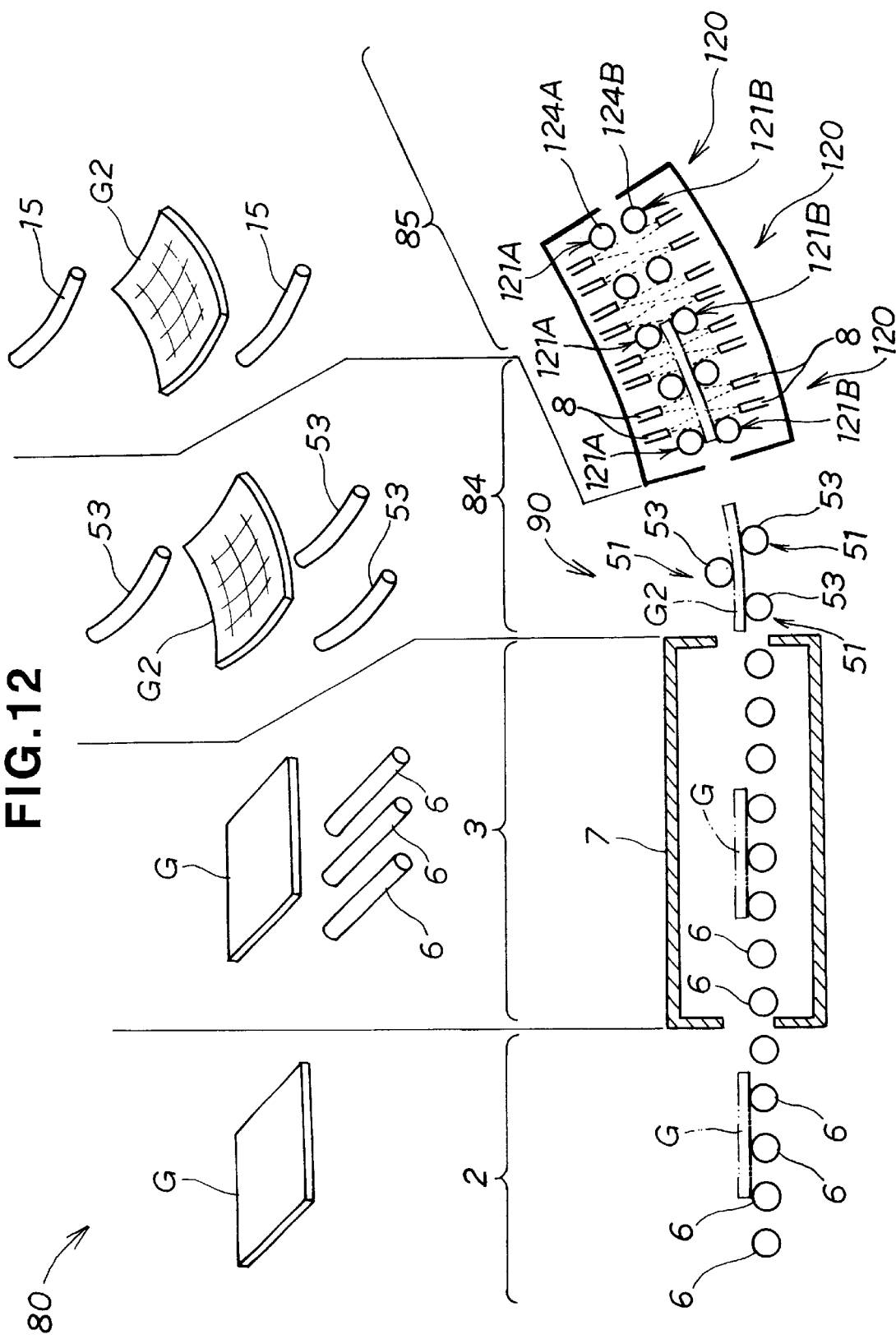
FIG. 12 is a diagrammatical view showing a bidirectional glass sheet bending process achieved by a curved glass manufacturing apparatus or line including a bending section according to another embodiment of the present invention.

In one mode of application, a plurality of such forming roll mechanisms 51 are incorporated in a curved glass manufacturing line 80 which is constructed to carry out a bidirectional glass sheet bending process, as shown in FIG. 12. The term "bidirectional glass sheet bending process" used herein refers to a bending process by which a flat glass sheet is bent into a curved glass sheet having a given curvature in each of its longitudinal and transverse directions over the entire area thereof. In FIG. 12 these parts or components which are the same as those shown in FIG. 1 are designated by the same reference characters, and further description thereof can, therefore, be omitted.

The curved glass manufacturing line 80 generally comprises a charging section 2, a heating section 3, a bending section 84 and a cooling section 85 with delivery conveyor system.

As shown in FIG. 12, the bending section 84 includes three forming roll mechanisms 51 disposed in staggered relation along a horizontal plane. One of the roll forming mechanisms 51 forms an upper mechanism and the remaining two roll forming mechanisms 51 form lower mechanisms and are disposed on opposite sides of the upper mechanism 51 when viewed from the lateral direction of the glass conveyance path. The forming roll mechanisms 51 thus arranged jointly form a roll-forming unit 90 and are arranged to perform bidirectional glass sheet bending operation.

The cooling section 85 includes a succession of longitudinally spaced conveyor units 87 each comprised of a cooperating pair of upper and lower conveyor roll mechanisms 11, 11, and a plurality of sets of upper and lower cooling air-nozzles 8 each disposed between an adjacent pair of the conveyor units 87. The conveyor units 87 are disposed along an arcuate path which is complementary to the longitudinal curvature of the curved glass sheet G2.

Figure 13A:
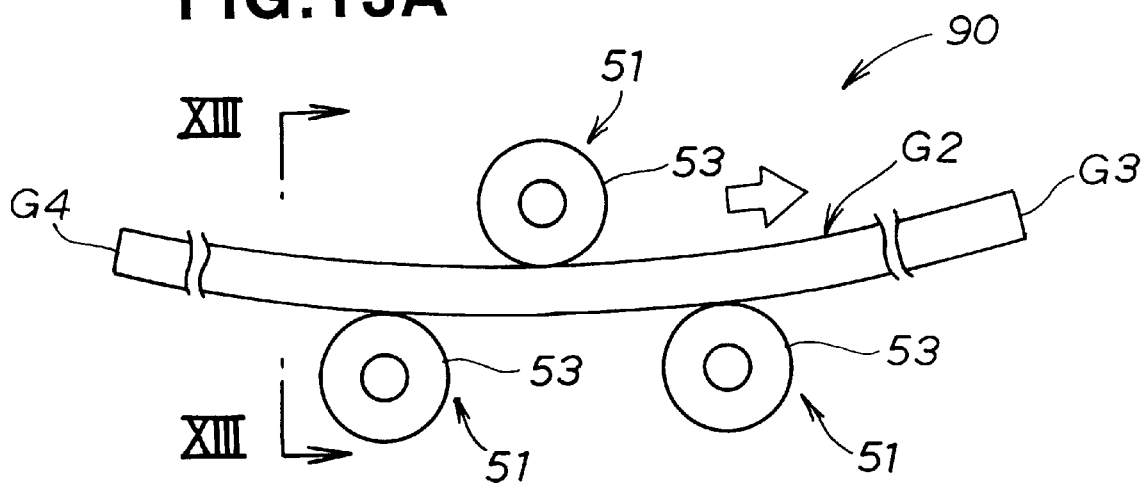
FIG. 13A is an enlarged view of the bending section of FIG. 12.

As shown on enlarged scale in FIG. 13A, when viewed from the transverse direction of the glass conveyance path, the respective forming rolls 53 of the forming roll mechanisms 53 are arranged to match a desired longitudinal curvature to be imparted to the heated flat glass sheet G as the latter is passed between the forming rolls 53.

Figure 13B:
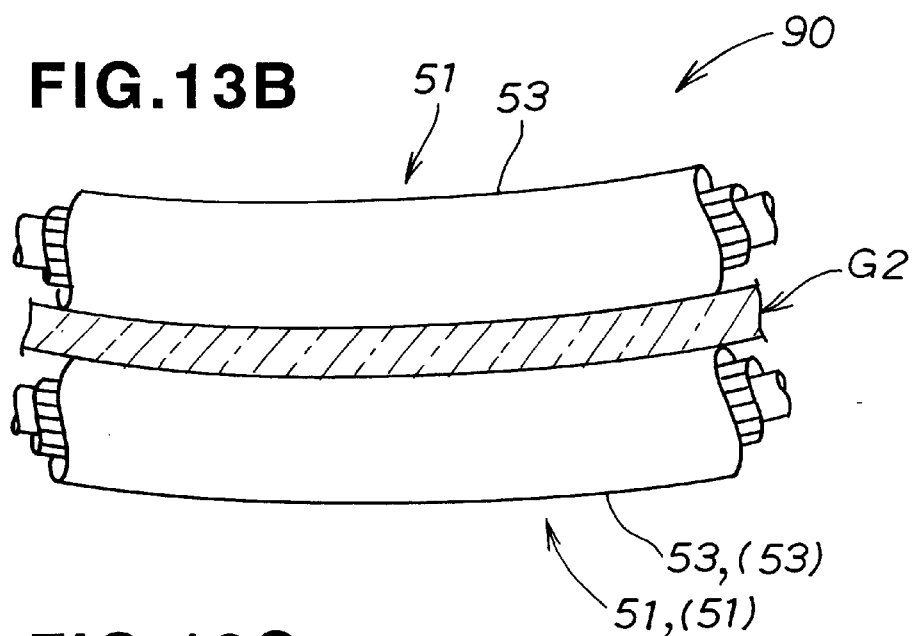
FIG. 13B is a cross-sectional view taken along line XIII—XIII of FIG. 13A.

When viewed from the longitudinal direction of the glass conveyance path, the forming rolls 53 have a downwardly arched configuration which is complementary to a desired transverse curvature to be imparted to the heated flat glass sheet G as the glass sheet G is passed between the forming rolls 53, as shown in FIG. 13B.

Figure 13C:
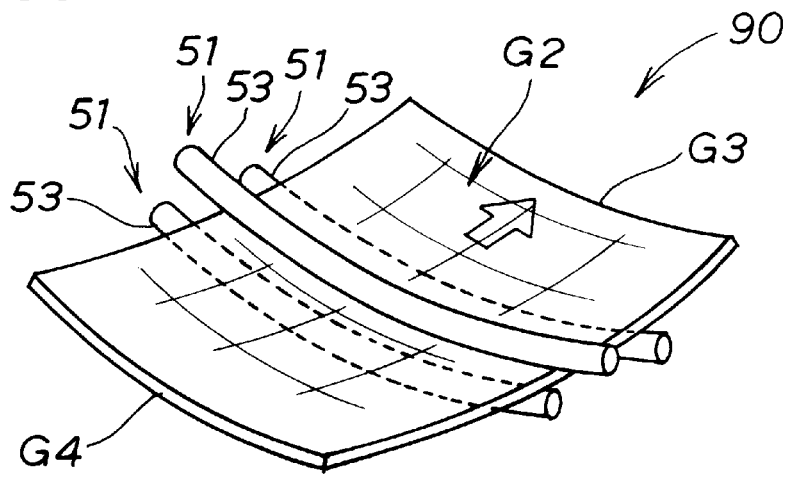
FIG. 13C is a perspective view showing a bending process achieved at the bending section.

Thus, the roll-forming unit 90 having a series of alternating upper and lower, downwardly arched forming rolls 53 is able to produce a bidirectionally curved glass sheet G2, as shown in FIG. 13C. In FIGS. 13A–13C, profiled arrows indicate a direction of movement of the glass sheet. Reference characters G3 and G4 denote a front end and a rear end, respectively, of the glass sheet.

Figure 14A:
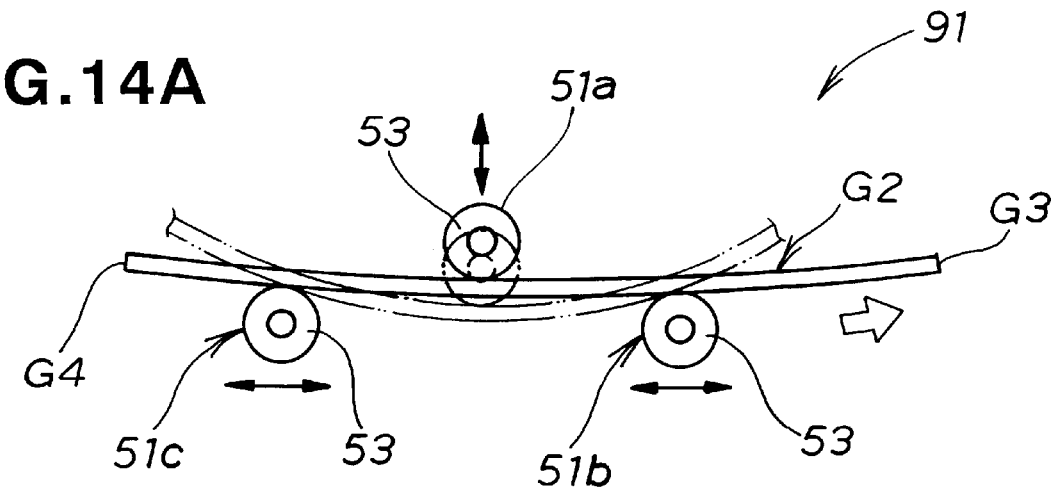
FIGS. 14A–14D are diagrammatical views illustrative of the manner in which a flat glass sheet is bent into a bidirectionally bent glass sheet at a modified bending section.

FIG. 14A shows a modification of the roll-forming unit according to the present invention. The modified roll-forming unit 91 differs from the roll-forming unit 90 of FIG. 13A–13C in that an upper forming roll mechanism 51a is vertically movable, and two lower forming roll mechanisms 51b and 51c are horizontally movable in a direction orthogonal to axes of the respective forming rolls 53, 53c, as indicated by the arrows show in the same figure.

Figure 14B:
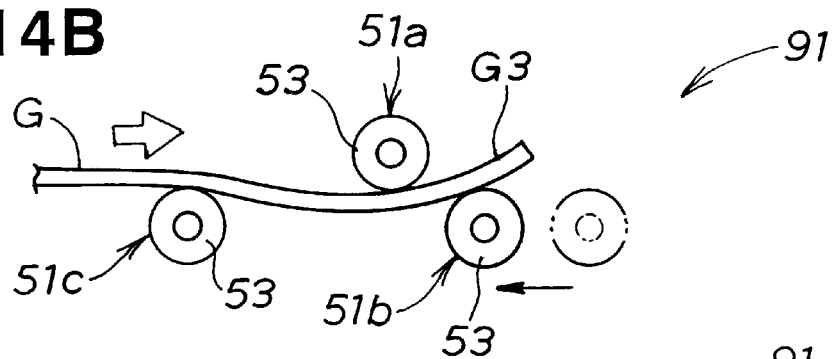

In operation, a downstream one 51b (right side in FIG. 14A) of the lower forming roll mechanisms 51b, 51c is moved in a horizontal direction toward the other lower forming roll mechanism 51c until it arrives at an operating position close to the upper forming roll mechanism 51a, as shown is FIG. 14B. With this arrangement, a front end portion G3 of the flat glass sheet G, as it passes between the upper and lower forming roll mechanisms 51a, 51b, is bent or curved upward.

Figure 14C:
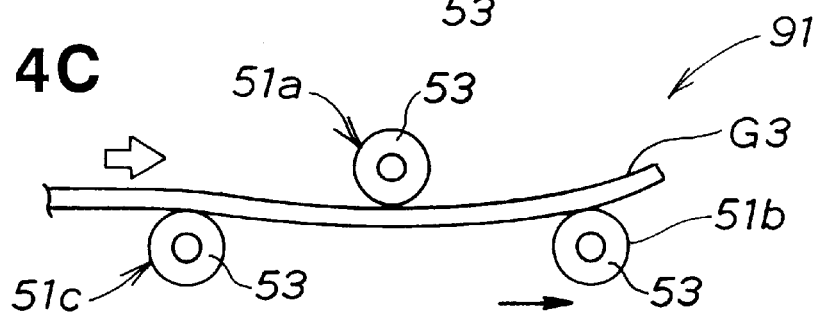

Upon completion of the foregoing, the lower forming roll mechanism 51b is returned to its original position, as indicated by the arrow shown in FIG. 14C.

Figure 14D:
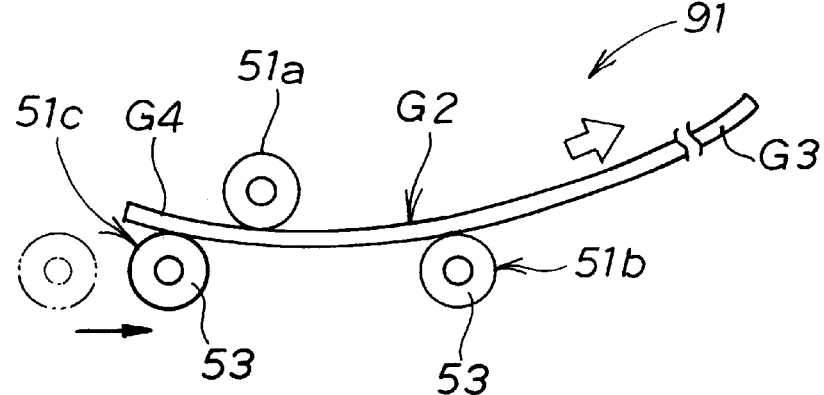

Then, in timed relation to advancing movement of the glass sheet, the upstream lower forming roll mechanism 51c is horizontally moved toward the downstream lower forming roll mechanism 51b until it arrives at an operating position close to the upper forming roll mechanism 51a, as shown in FIG. 14D. With this arrangement, a rear end portion G4 of the glass sheet, as it passes between the upper and lower forming roll mechanisms 51a, 51c, is bent upward. A curved glass sheet G2 having a desired curvature is thus produced.

By virtue of the vertically movable upper forming roll mechanism 51a, the roll-forming unit 91 is able to produce various curved glass sheets with different longitudinal curvatures (see FIG. 1). Additionally, the horizontally movable lower forming roll mechanisms 51b, 51c enable the roll-forming unit 91 to impart a desired curvature to the front and rear end portions G3, G4 of the glass sheet with improved reliability.

FIG. 15A shows a roll-forming unit 92 according to a further modification of the present invention. The roll-forming unit 92 differs from the roll-forming unit 91 of FIG. 14A in that two vertically movable lower forming roll mechanisms 51d, 51e are added between the endmost two lower forming roll mechanisms 51b, 51c, and the endmost lower forming roll mechanisms 51b, 51c are fixed in position. When viewed from the transverse direction of the glass sheet conveyance path, the movable lower forming roll mechanisms 51d, 51e are disposed on opposite sides of the upper forming roll mechanism 51a.

In operation, one movable lower forming roll mechanism 51d, which is located on the downstream side the upper forming roll mechanism 51a, is raised to assume an operating position located near the upper forming roll mechanism 51a, as shown in FIG. 15B. With this arrangement, a front end portion G3 of a heated flat glass sheet G, as it passes between the upper and lower forming roll mechanisms 51a, 51d, is bent upward, as shown in FIG. 15B. Upon completion of the foregoing bending, the movable lower forming roll mechanism 51d is lowered to its original position, as shown in FIG. 15C.

Then, in timed relation to advancing movement of the glass sheet, the other movable lower forming roll mechanism 51e is raised to an operating position near the upper forming roll mechanism 51a. With this arrangement, a rear end potion G4 of the glass sheet is bent upwardly, as shown in FIG. 15D.

Use of the vertically movable lower forming roll mechanisms 51d, 51e insures reliable bending of the front and rear end portions G3, G4 of the glass sheet.

The cooling section 85 includes a succession of longitudinally spaced conveyor units 120 each comprised of a cooperating pair of upper and lower conveyor roll mechanisms 121A, 121B, and a plurality of sets of upper and lower cooling air-nozzles 8 each disposed between an adjacent pair of the conveyor units 120.

Figure 16:
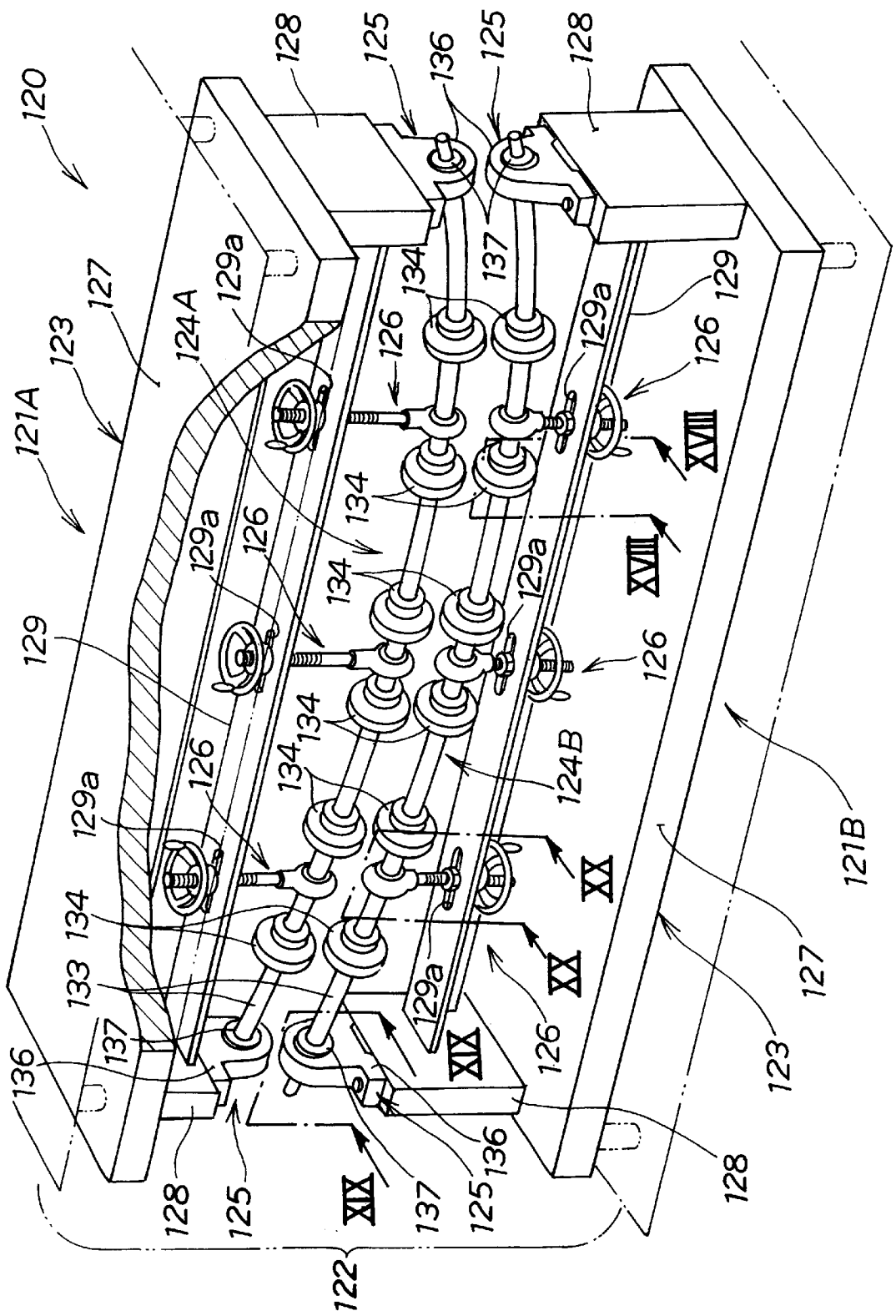
FIG. 16 is a perspective view, with parts cutaway for clarity, of one conveyor unit of a delivery conveyor system.

Reference is now made to FIG. 16 which shows in perspective one of the conveyor unit 120. The conveyor unit 120 includes a frame 122 on which the upper conveyor roll mechanisms 121A and the lower conveyor roll mechanisms 121B are supported in vertically opposed condition. The upper and lower conveyor roll mechanisms 121A and 121B have the same construction and, hence, explanation given below will be directed to the lower conveyor roll mechanisms 121B only.

The lower conveyor roll mechanism 121B includes a base 123, a conveyor roll 124B, right and left support members 125, 125 and a plurality of bending support members 126. The lower conveyor roll 124B is supported at its opposite end portions by the right and left support members 125 such that the conveyor roll 124B can rotate about its longitudinal axis and also can tilt about the support members 125. The bending support members 126 are arranged to act between the base 123 and the conveyor roll 124B and operated to bend the conveyor roll 124B into a desired curvature. Reference character 124A denotes a conveyor roll of the upper conveyor roll mechanism 121.

The base 123 is composed of an elongated horizontal base member 127 extending in the transverse direction of the glass sheet conveyance line or path, a pair of support blocks 128, 128 mounted to opposite ends of the elongated base member 127 for supporting thereon the right and left support members 125, 125, and a cross member 129 extending between the support blocks 128, 128. The cross member 129 has a plurality of oblong holes 129a spaced at longitudinal intervals along the length of the cross member 129.

Figure 17:
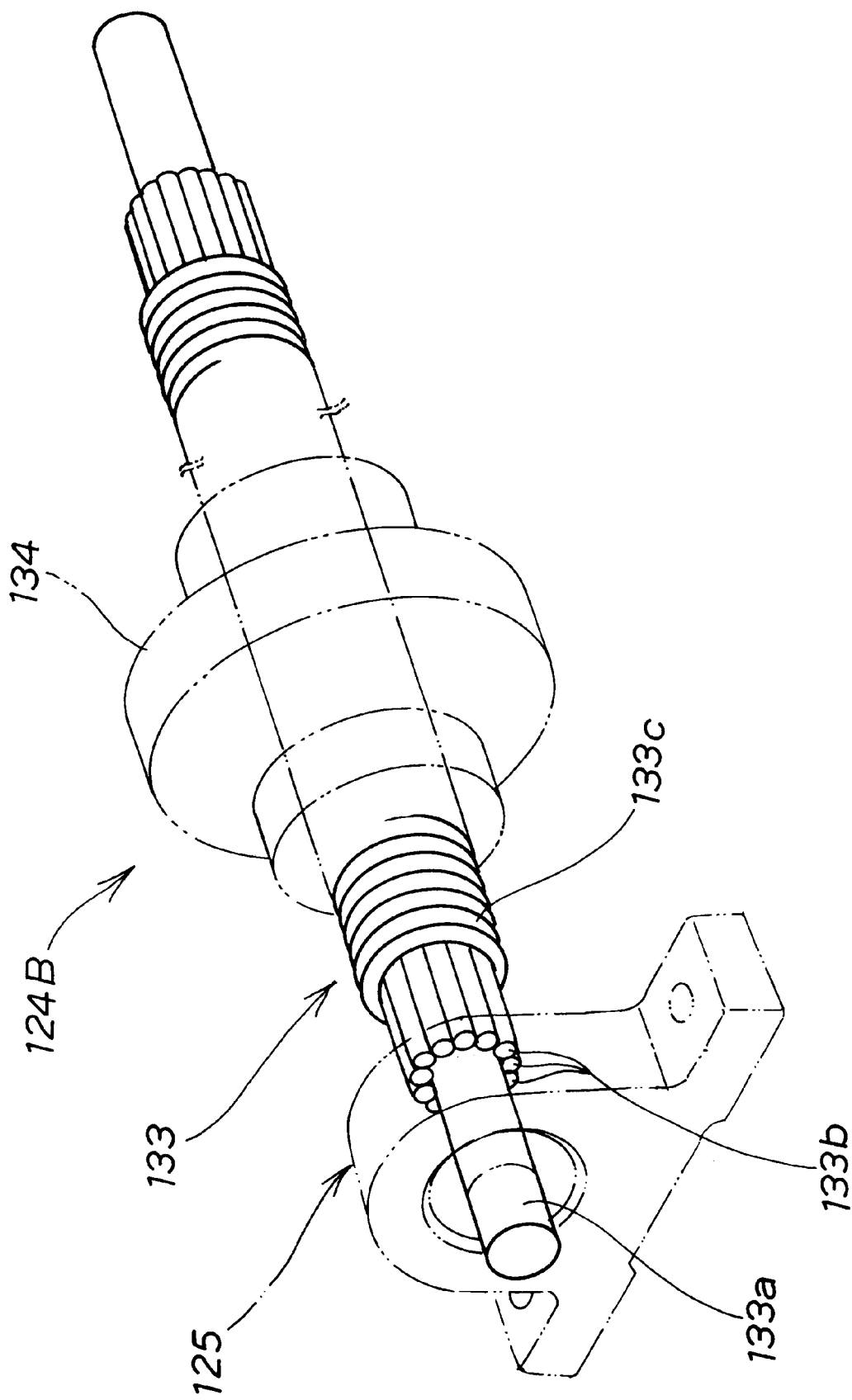
FIG. 17 is a perspective view of a roll of the conveyor unit.

As shown in FIG. 17, the conveyor roll 124B includes a resilient rod 133 and a plurality of work supporting disks 134 attached to the rod 133 at intervals along the length of the conveyor roll 124B.

The resilient rod 133 is composed of a core member 133a of resilient material, a peripheral member 133b disposed around the core member 133, and a helically coiled spring 133c wound around the peripheral member 133b to tightly bind the core member 133a and the peripheral member 133b. The peripheral member 133b is comprised of a plurality of resilient strands arranged longitudinally of the core member 133a in close juxtaposition around the peripheral surface of the core member 133a. Thus, the rod 133 constitutes a composite resilient assembly formed jointly by the resilient core 133a, the resilient peripheral members or strands 133b, and the resilient coil spring 133c. Though not shown in FIG. 17, the upper conveyor roll 124A (FIG. 16) has the same construction as the lower roll 124B.

Figure 18:
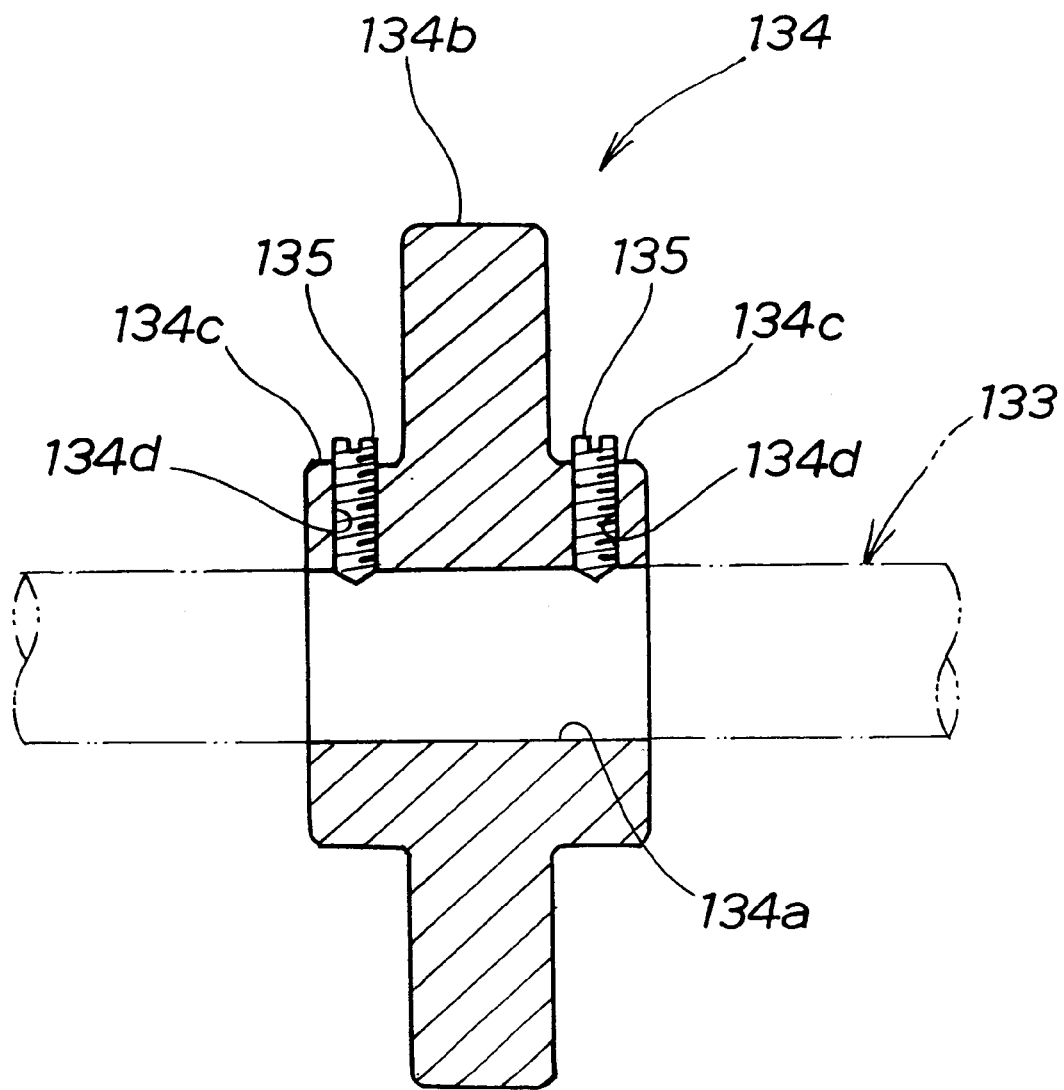
FIG. 18 is a cross-sectional view taken along line XVIII—XVIII of FIG. 16.

As shown in FIG. 18, each of the work supporting disks 134 is a circular disk having a central hole 134a in which the rod 133 is slidably received. The circular disk 134 has an outside cylindrical surface 134b and a pair of coaxial annular bosses 134c projecting from opposite surfaces of the disk 134. The bosses 134c have an outside diameter smaller than that of the outside cylindrical surface 134b of the disk 134. Each of the bosses 134c has a plurality of internally thread radial holes 134d (one being shown). A set screws 135 is threaded into each of the radial holes 34d to tightly fasten the disk 134 to the rod 133.

Figure 19:
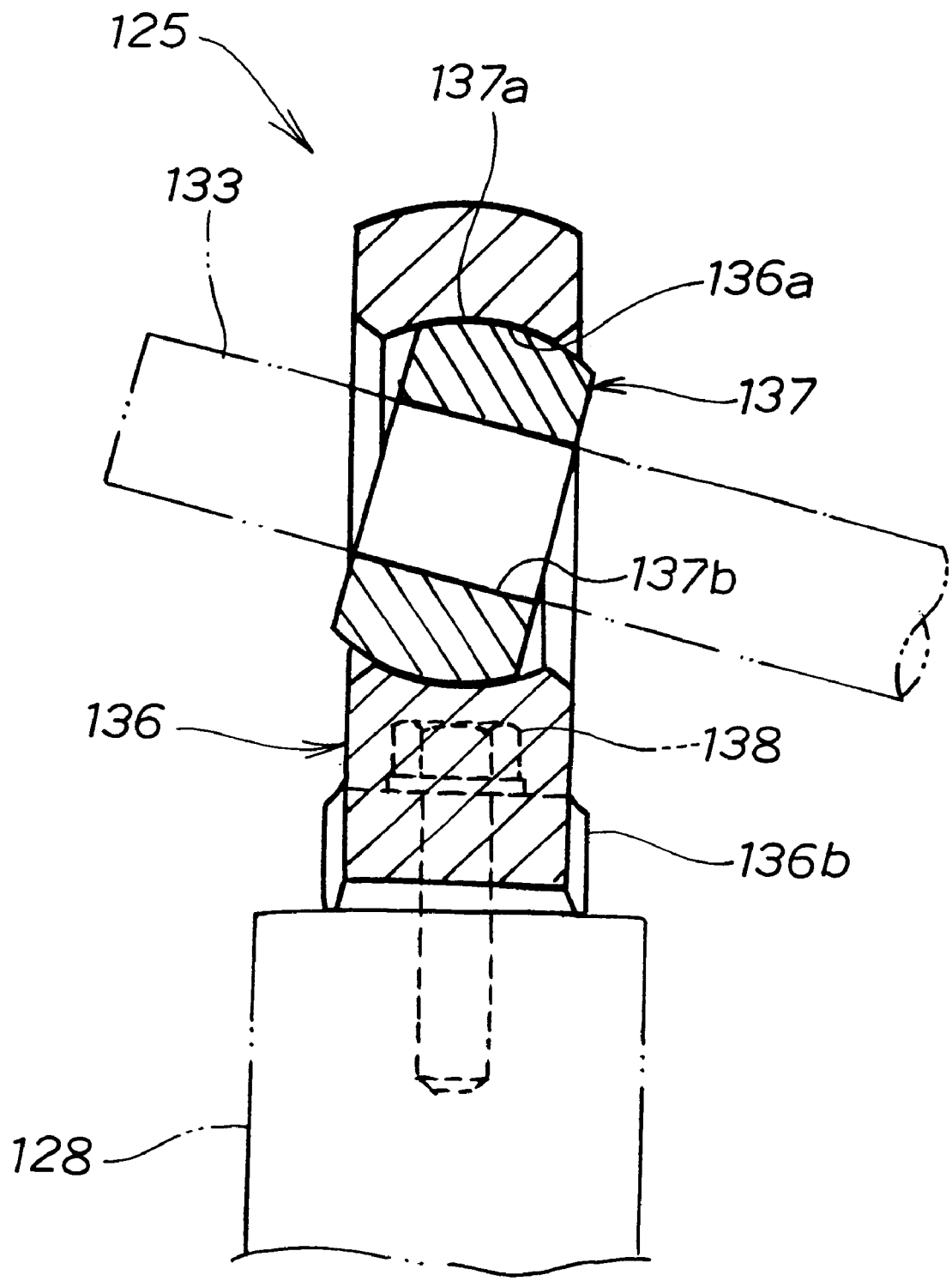
FIG. 19 is a cross-sectional view taken along line XIX—XIX of FIG. 16.

Reference is now made to FIG. 19 which shows a cross section of the support member 125.

As shown in FIG. 19, the support member 125 includes a housing 136, and a spherical segment member 137 pivotally received in a spherical hole (not designated) of the housing 136 for swivel movement relative to the housing 136. The segment member 137 has a spherical outside surface 137a slidably fitted with a spherical inside surface 136a of the housing 136. Thus, the support member 125 is comprised of a spherical bearing. The housing 136 has a pair of laterally projecting mounting bases 136b (one being shown) secured by a pair of screws 138 (one being shown), respectively, to the support block 128. The spherical segment member 137 has a central hole 137 in which the rod 133 is slidably received.

Because the spherical segment member 137 is pivotally movable about a central axis of the housing 136 within a predetermined angular range, and because the rod 133 is rotatable relative to the spherical segment member 137, the support member 125 is able to rotatably support an end of the rod 133 while allowing the same rod end to tilt about the support member 125.

Figure 20:
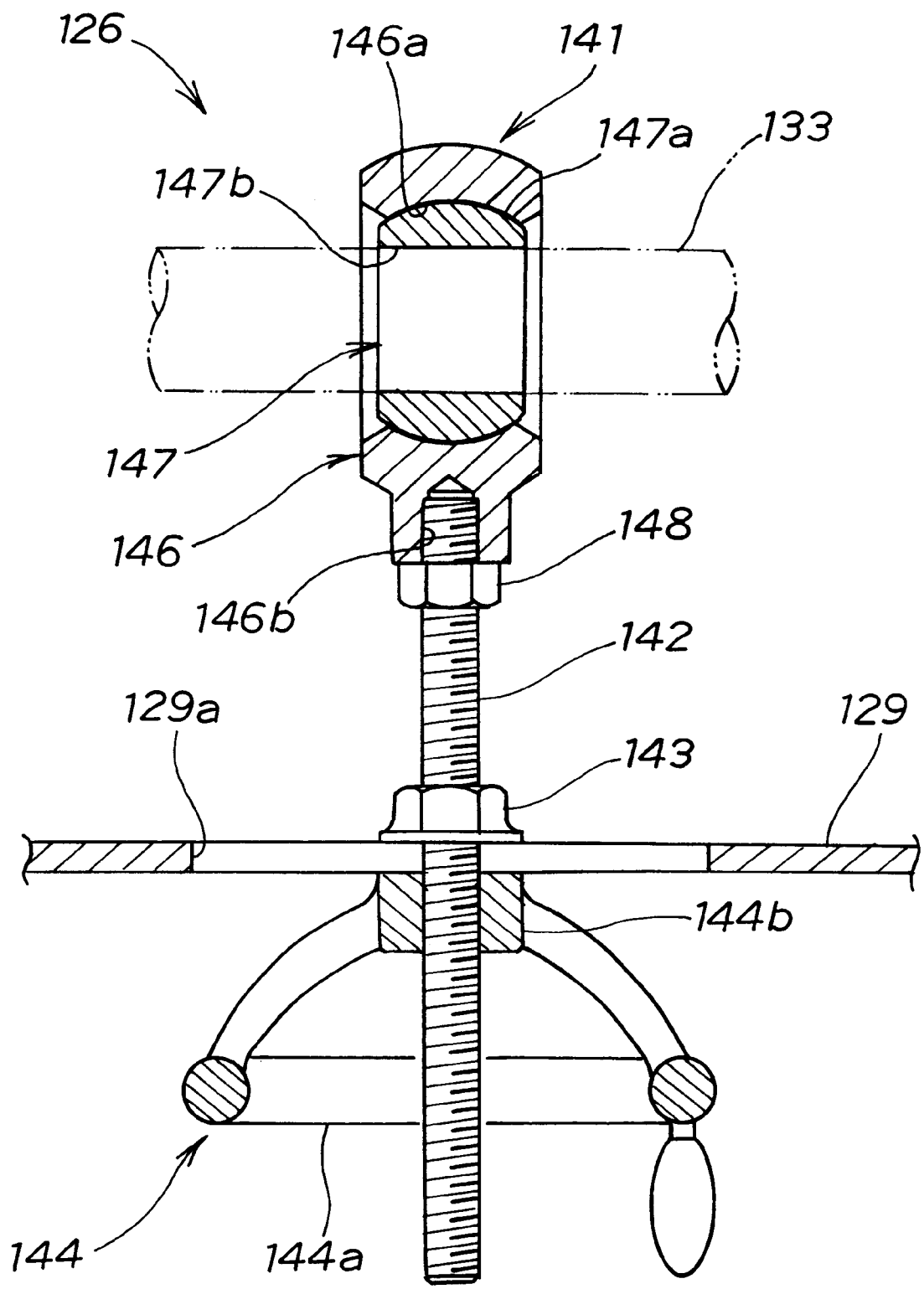
FIG. 20 is a cross-sectional view taken along line XX—XX of FIG. 16.

As shown in FIG. 20, each of the bending support members 126 includes a supporting head 141 for rotatably supporting the rod 133, a screw shaft 142 connected at one end to the support head 141 and extending through one of the oblong hole 129a, an adjustment nut 143 disposed between the cross member 129 and the support head 141 and threaded with the screw shaft 142 so as to adjustably set the distance between the cross member 120 and a central axis of the support head 141, and a lock nut 144 with handle threaded with the screw shaft 142 to secure the screw shaft 142 in position against movement relative to the cross member 129.

The support head 141 includes a housing or socket 146 and a spherical segment member 147 pivotally received in the socket 146 for pivotal movement relative to the socket 146. The segment member 147 has a spherical outside surface 147a of the segment member 147 which is in sliding fit with a spherical inside surface 146a of the socket 146. The socket 146 has an internally threaded hole 146b in which one end of the screw shaft 142 is threaded. The end of the screw shaft 142 is tightly fastened to the socket 146 by means of a nut 148 threaded with the screw shaft 142. The spherical segment member 147 has a central hole 147b in which the rod 144 is slidably received.

The lock nut 144 with handle includes a wheel-like handle portion 144a and a nut portion 144b integral with a central portion of the wheel-like handle portion 144a. The nut portion 144b is threaded with the screw shaft 142 and is tightly fastened to the cross member 129, with the cross member 129 interposed between the adjustment nut 143 and the lock nut 144 with handle.

The bending support member 126 operates to bend or flax the rod 133 into a desired curvature. By loosening the adjustment nut 143, it becomes possible to move the screw shaft 142 along the oblong hole 129a for enabling positional adjustment of the support head 141 in the longitudinal direction of the rod 133. While the adjustment nut 143 is kept loosened, the wheel-like handle portion 144a of the lock nut 144 is rotated to turn the nut portion 144b in the tightening direction, causing the screw shaft 142 to move downward in FIG. 20 until the adjustment nut 143 comes into abutment with the cross member 129. With this downward movement of the screw shaft 142, the support head 141 pulls a portion of the rod 133 downward. Alternately, when the adjustment nut 143 is turned in the loosening direction while the lock nut 144 is kept loosened, the screw shaft 142 moves upward in FIG. 20, thereby forcing the rod portion upwardly via the support head 141. Thus, the bending support members 126 are operated to push or pull longitudinally spaced portions of the rod 133 in a direction orthogonal to the longitudinal axis of the rod 133 such that the rod 133 is bent into a desired curvature. The desired curvature of the rod 133 is maintained by the bending support members 126 because the rod 133 is always rotatably and slidably supported by the support heads 141 of the bending support members 126.

To achieve reliable conveyance of the bidirectionally curved glass sheets G2 received in succession from the shaping section 84 (FIG. 12), the conveyor units 120 of the foregoing construction are set as follows.

Figure 21A:
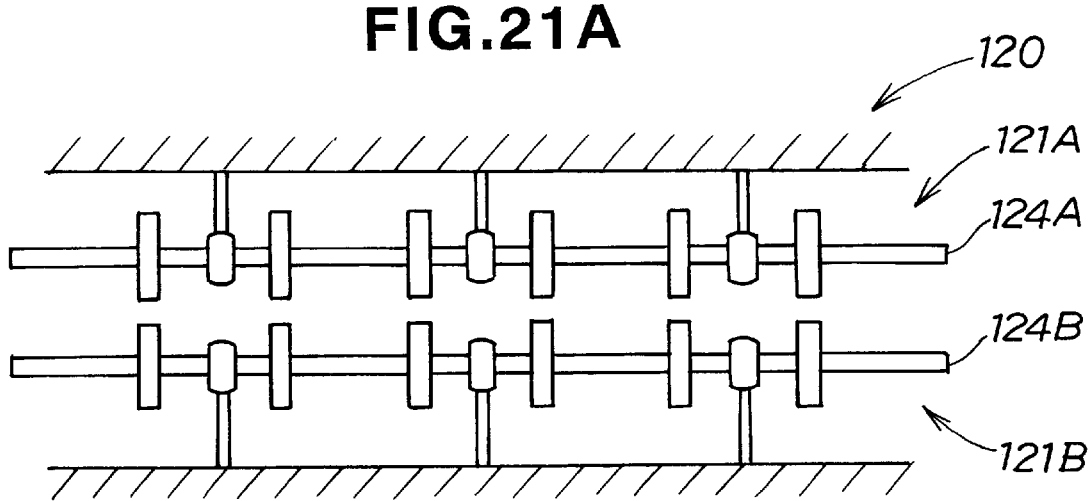
FIGS. 21A–21C are diagrammatical views illustrative of the manner in which a pair of upper and lower rolls of the conveyor unit is set into a desired curvature.

As shown in FIG. 21A, in each of the conveyor units 120, the respective rolls 124A, 124B of the upper and lower conveyor roll mechanisms 121A, 121B are initially set to extend horizontally in straight lines.

Figure 21B:
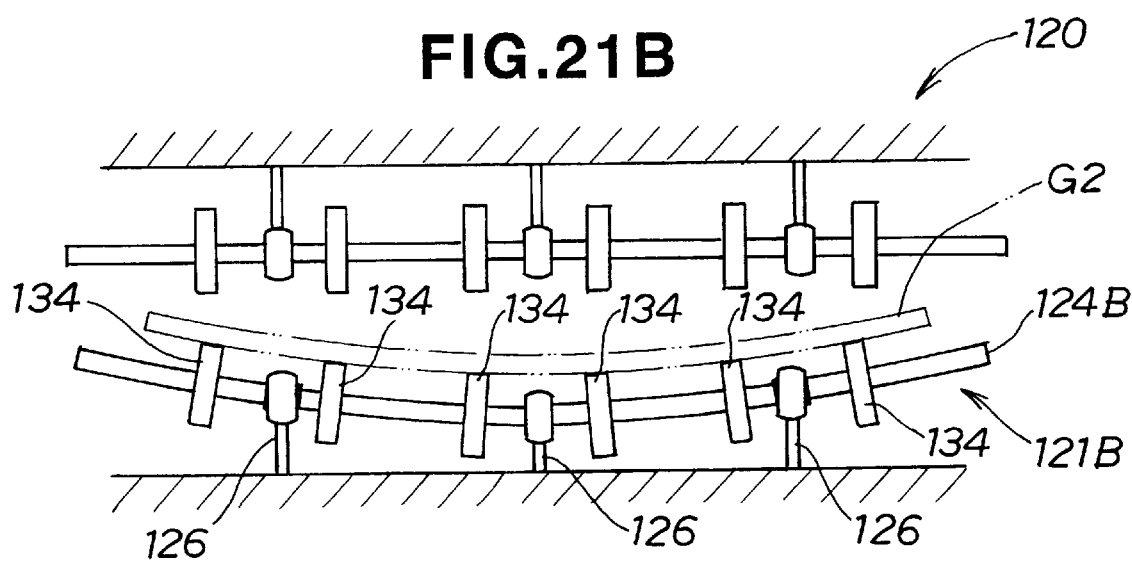

Then, the bending support members 126 of the lower conveyor roll mechanism 121B are adjusted such that the lower conveyor roll 124B is bent into a downwardly arched on figuration with a desired curvature, as shown in FIG. 21B. The desired curvature of the lower conveyor roll 124B is complemental to an arcuate transverse curvature (i.e., an arcuate curvature in the transverse direction) of the curved glass sheet G2 to be conveyed by the conveyor units 120.

Figure 21C:
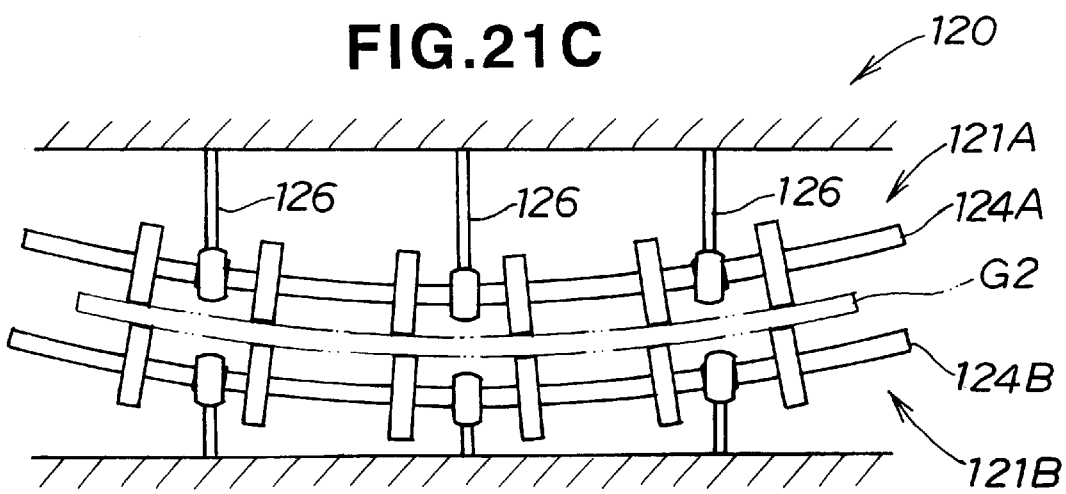

Thereafter, the bending support members 126 of the upper conveyor roll mechanism 121A are properly adjusted such that the upper conveyor roll 124A is bent into a downwardly arched configuration with substantially the same curvature as the lower conveyor roll 121B, as shown in FIG. 21C. In this instance, confronting pairs of disks 134 (FIG. 16) of the upper and lower conveyor roll mechanisms 121A, 121B are spaced from each other by a distance which is slightly smaller than the thickness of the curved glass sheet G2 to be conveyed. Thus, the curved glass sheet G2 is smoothly and reliably conveyed by the conveyor units 120 while it is gripped between the upper and lower conveyor rolls 124A, 124B.

Figure 22A:
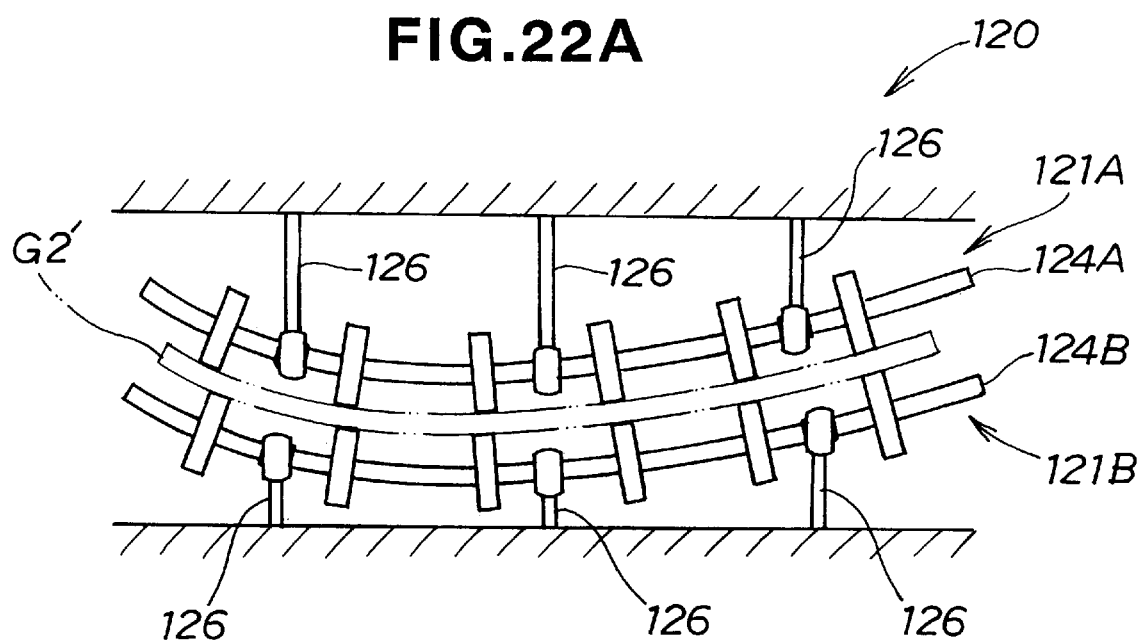
FIGS. 22A and 22B are diagrammatical views similar to FIG. 21C, but showing the conveyor unit set for conveyance of curved glass sheets having different curvatures.

In the case where a subsequent batch of curved glass sheets G2' to be conveyed have a different transverse curvature, as shown in FIG. 22A, the respective bending support members 126 of the upper and lower conveyor roll mechanisms 121A, 121B are properly adjusted such that the upper and lower rolls 124A, 124B are bent to assume a curvature complemental to the transverse curvature of the curved glass sheets G2'.

Figure 22B:
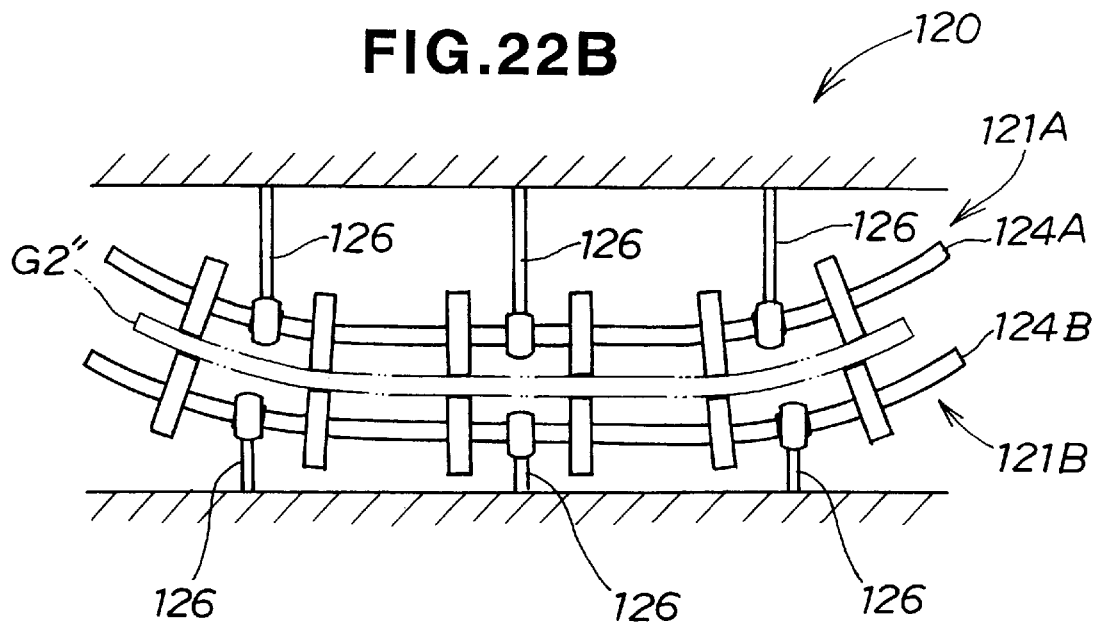

Similarly, when used in conveyance of curved glass sheets G2" having a transverse section composed of a flat central portion and upwardly bent opposite end portions, such as shown in FIG. 22B, the respective bending support members 126 of the upper and lower conveyor roll mechanisms 121A, 121B are properly adjusted to bend the upper and lower rolls 124A, 124B into a configuration complementary to the transverse cross-sectional shape of the curved glass sheets G2" to be conveyed.

It should be appreciated from the foregoing description that the conveyor system including the conveyor units 120 of the present invention is able to achieve reliable conveyance of curved glass sheets having different transverse curvatures. Additionally, the conveyor units 120 disposed in succession along the glass sheet conveyance line or path can be arranged to enable reliable conveyance of curved glass sheets having both longitudinal and transverse curvatures.

Figure 23:
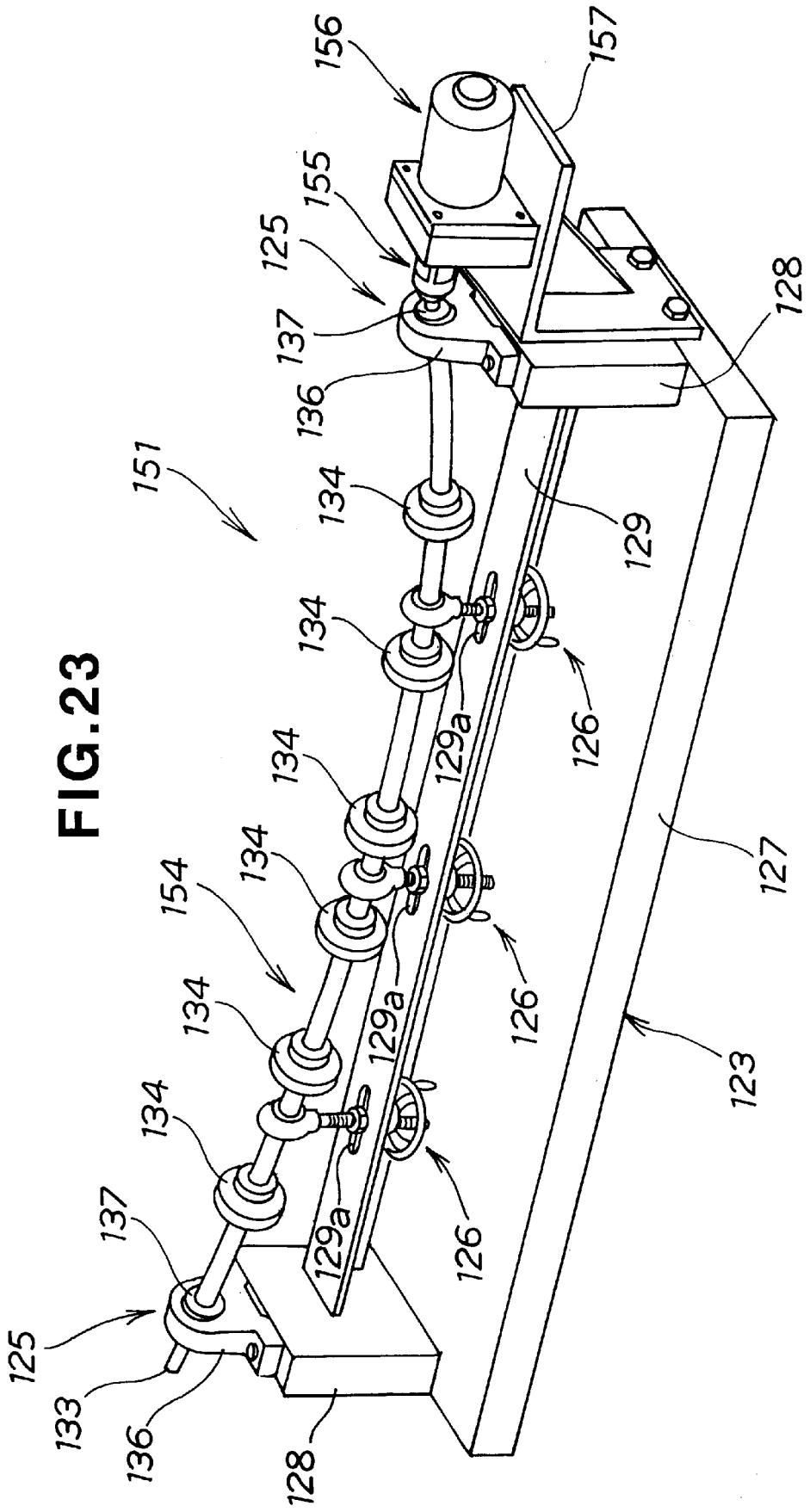
FIG. 23 is a perspective view of a conveyor roll mechanism according to another embodiment of the present invention.

FIG. 23 shows in perspective view a lower conveyor roll mechanism 151 according to another embodiment of the present invention. In FIG. 23, these parts which are the same as those of the first embodiment shown in FIG. 16 are designated by the same reference characters, and no further explanation thereof is necessary.

The conveyor roll mechanism 151 includes an elongated rectangular base 127, right and left support members 125, 125 mounted on opposite end portions of the base 127 via right and left support blocks 128, 128, respectively, a conveyor roll 154 supported at opposite end portions by the support members 125, 125 such that the conveyor roll 154 is rotatable about its longitudinal axis and can tilt about a central axis of the support members 125, 125, a plurality of bending support members 126 for causing the conveyor roll 154 to flex into a desired curvature, and a geared motor 156 coupled with one end of the roll 154 via a universal joint 155. The conveyor roll 154 is substantially the same in construction as the lower conveyor roll 124B shown in FIG. 17. The geared motor 156 is attached to the base 127 via a bracket 157.

Because the geared motor (drive source) 156 for directly driving the roll 154 is provided as a unitary part of the conveyor roll mechanism 151, the conveyor roll mechanism 51 has a great degree of flexibility in terms of layout. This structure is particularly advantageous when the layout of the conveyor system is to be changed to deal with the conveyance of curved glass sheets having different curvatures.

Figure 24:
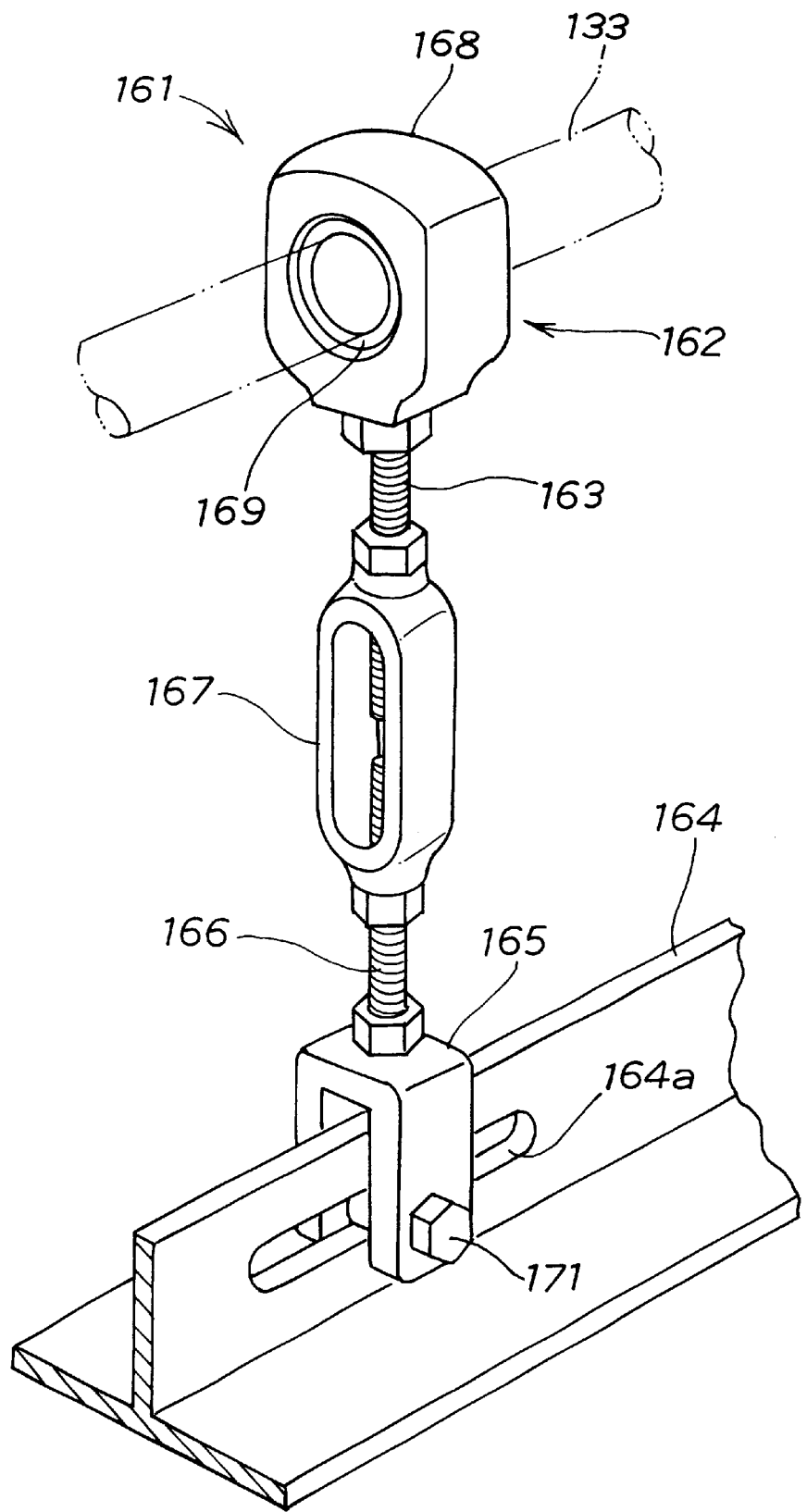
FIG. 24 is a perspective view of a modified bending support member of the conveyor unit.

FIG. 24 shows a modified form of the bending support member according to the present invention. The modified bending support member 161 includes a support head 162 for rotatably supporting the rod 133, a first screw rod 163 with left-hand thread connected at one end (upper en) to the support head 162, a U-shaped stay 165 pivotally connected to a cross member 164, a second screw rod 166 with right-hand thread connected at one end (lower end) to the stay 165, and a sleeve 167 threaded at opposite ends with the first and second screw rods 163, 166 with the respective other ends of the screw rods 163, 166 facing each other. The screw rods 163, 166, the sleeve 167 and the stay 165 jointly form a turnbuckle.

The support head 162 is comprised of a spherical bearing including a housing or socket 168, and a spherical segment member 169 pivotally received in the socket 168 for swivel movement to accommodate wobbling of the longitudinal axis of the rod 133 relative to the socket 168.

The cross member 164 has an inverted T-shaped cross section including an upright or vertical rib (not designated), and a plurality of horizontally extending oblong holes (one being shown) 164a formed in the vertical rib at longitudinal intervals. The U-shaped stay 165 is attached to the vertical rib of the cross member 164 by means of a pivot pin 171 extending between opposite plates (not designated) of the U-shaped stay 165 through the oblong hole 164a. Two lock nuts (not designated) are normally held in abutment with opposite ends of the sleeve 167 so that the sleeve 167 is locked in position against rotation relative to the screw rods 163, 166.

With this construction, while the two lock nuts are kept loosened, the sleeve 167 is rotated clockwise in FIG. 24 to thereby move the support head 162 downward. The downward movement of the support head 162 causes the rod 133 to flex downward. Alternately, counterclockwise rotation of the sleeve 167 causes upward movement of the support head 162, forcing the rod 133 to flex upward.

In the illustrated embodiments, the rod 33 has a composite structure composed of three component parts (i.e., the resilient core 133a, resilient strands 133b, and helical coil spring 133c). The number of component parts of the rod 133 should by no means be limited to three as in illustrated embodiments. As an alternative, a rod formed of a single resilient material may be employed.

The present invention has various advantages, as enumerated below.

The forming roll composed of a resilient rod covered with a thin cover member is able to form a curved glass sheet of a desired curvature without involving deformation or distortion because the eccentricity of the forming roll is considerably smaller than that of a conventional forming roll composed of a core shaft and circular rings rotatably mounted on the core shaft.

Unlike the conventional forming roll having a convex or a concave longitudinal cross-sectional shape, the circumferential speed of the inventive forming roll is constant throughout the length of the forming roll even when the forming roll is bent into an arched configuration. The forming roll is, therefore, able to produce a high-surface-quality curved glass sheet without producing a mark or scar on either surface of the curved glass sheet.

During the glass sheet bending operation, the arched configuration of the forming roll is maintained against a reaction force by means of the backup rollers which are held in rolling contact with the circumferential surface of the forming roll. The backup rollers are adjustable in position so that they can follow up various arched configurations of the forming roll.

The forming roll may be coupled with a drive source such as a geared motor. Since the geared motor (drive source) for directly driving the forming roll is provided as a unitary part of the forming roll mechanism, the forming roll mechanism has a great degree of flexibility in terms of layout and hence is readily adaptable to frequent layout changes of the bending section of the curved glass manufacturing line.

The conveyor roll of the present invention includes a plurality of work-supporting circular disks attached to a resilient rod for co-rotation therewith. The work-supporting circular disks, as opposed to similar circular disks rotatably mounted on the rod, do not produce wobbling motion during conveyance of the curved glass sheets. Thus, the conveyed curved glass sheets are completely free from surface undulations and do not produce warping or distortion when an image is formed by light either reflected from a surface of the curved glass sheet or transmitted through the curved glass sheet.

Additionally, the outside diameter of the conveyor roll is always constant even when the roll is bent into a given curvature complementary to the curvature of curved glass sheets to be conveyed. Thus, unlike a conveyor roll having a convex or a concave longitudinal cross-sectional shape, the conveyor roll while rotating has the same circumferential speed throughout the length thereof and hence is able to achieve reliable conveyance of the curved glass sheets without deteriorating surface qualities of the curved glass sheets.

Furthermore, by virtue of the bending support members arrange at intervals along the length of the conveyor roll, it becomes possible to flex or bend the conveyor roll into any desired curvature. The conveyor roll can, therefore, be used in the conveyance of a wide variety curved glass sheets having different curvatures.

The resilient rod of the conveyor roll may be coupled with a drive source such as a geared motor. Since the geared motor (drive source) for directly driving the conveyor roll is provided as a unitary part of the conveyor roll mechanism, the conveyor roll mechanism has a great degree of flexibility in terms of layout and hence is readily adaptable to frequent layout changes of the conveyor system in the curved glass manufacturing line.

In the conveyor roll unit including vertically arranged two conveyor roll mechanisms, bidirectionally curved glass sheets are stably conveyed while they are gripped between the upper and lower conveyor rolls of the conveyor roll mechanisms.

Obviously, various changes and modifications of th4e present invention are possible in the light of the above teaching. It is therefore to be noted that the invention may be practiced otherwise than as specifically described.

What is claimed is:

1. A curved glass manufacturing apparatus comprising:
   at least one roll-forming unit composed of at least one upper forming roll mechanism and at least one lower forming roll mechanism cooperating with said upper forming roll mechanism to form a heated flat glass sheet into a curved glass sheet of a desired curvature, each of said upper and lower forming roll mechanisms including
      a forming roll having a resilient rod covered with a cover member except opposite end portions thereof,
      a pair of support members rotatably supporting said opposite end portions of said resilient rod while allowing said resilient rod to tilt about said support members,
      a bending unit coupled with at least one of said opposite end portions of said resilient rod for applying to said at least one end portion an external force tending to flex said forming roll into either an upwardly arched configuration or a downwardly arched configuration, and
      at least one backup roller unit being in rolling engagement with said forming roll to maintain the arched configuration of said forming roll.

2. A curved glass manufacturing apparatus according to claim 1, wherein each of said upper and lower forming roll mechanisms further includes a drive source coupled with the end portion of said resilient rod not attached to said bending unit to rotate said forming roll.

3. A curved glass manufacturing apparatus according to claim 1, wherein said resilient rod is composed of an elongated core member of resilient material, a plurality of resilient strands laid longitudinally on a peripheral surface of said core member in close juxtaposition around said core member, and a helical coil spring wound around said resilient strands to tightly bind together said resilient strands and said core member.

4. A curved glass manufacturing apparatus according to claim 1, wherein said cover member comprises a seamless tube having a knit structure formed of a glass fiber, ceramic fiber, metal fiber, aramid fiber or the combination thereof.

5. A curved glass manufacturing apparatus according to claim 1, wherein said cover member comprises a continuous tape wound around said resilient rod and having a woven structure formed of a glass fiber, ceramic fiber, metal fiber, aramid fiber or the combination thereof.

6. A curved glass manufacturing apparatus according to claim 1, wherein said support members each include a fixed housing having a spherical hole, and a spherical segment member pivotally received in said spherical hole and rotatably supporting one of said opposite end portions of said resilient rod.

7. A curved glass manufacturing apparatus according to claim 1, wherein said bending unit includes a tubular holder pivotally supported by one of said support members and having an axial blind hole in which said one end portion of said resilient rod is slidably and rotatably received, and an adjustment screw threaded through a closed end of said tubular holder into said axial blind hole and adapted to be turned to displace said one end portion of said resilient rod in an axial inward direction for causing said forming roll to flex in said arched configuration.

8. A curved glass manufacturing apparatus according to claim 7, wherein said bending unit further includes a compression coil spring and a steel ball in said axial blind hole of said tubular holder and disposed between said adjustment screw and said one end portion of said resilient rod, a first spring seat disposed between said adjustment screw and one end of said compression coil spring, and a second spring seat disposed between the other end of said compression coil spring and said steel ball.

9. A curved glass manufacturing apparatus according to claim 8, wherein said compression coil spring has a resiliency greater than that of said resilient rod of said forming roll.

10. A curved glass manufacturing apparatus according to claim 7, wherein said support members each include a fixed housing having a spherical hole, and a spherical segment member pivotally received in said spherical hole and having a central hole, said tubular holder is firmly fitted in said central hole of said spherical segment member.

11. A curved glass manufacturing apparatus according to claim 1, wherein said bending unit includes a socket having a spherical hole, a spherical segment member pivotally received in said spherical hole of said socket and having a central hole in which said one end portion of said resilient rod is rotatably received, a fixed support nut having a vertically extending threaded hole, and a screw shaft threaded through said fixed support nut and having an end connected to said socket, said screw shaft being adapted to be turned to move said socket and said spherical segment member in a vertical direction for causing said resilient rod to tilt about said support members.

12. A curved glass manufacturing apparatus according to claim 1, wherein said backup roller unit includes a roller holder, a pair of support rollers rotatably mounted on said roller holder in symmetric relation to one another about a vertical plane passing through an axis of said forming roll for rolling engagement with a circumferential surface of said forming roll, a fixed support nut having a vertically extending threaded hole, and a screw shaft threaded through said support nut and connected at an end to said roller holder, said screw shaft being adapted to be turned to move said support roller in vertical directions toward and away from said forming roll.

13. A curved glass manufacturing apparatus according to claim 1, for use in the manufacture of a bidirectionally curved glass sheet having curvatures about two mutually perpendicular axes thereof, wherein said roll-forming unit includes one said upper forming roll mechanism and two said lower forming roll mechanisms, the respective forming rolls of said upper and lower forming roll mechanisms being arranged to match a curvature to be imparted to the heated glass sheet about an axis thereof extending orthogonally to the axes of said forming rolls.

14. A curved glass manufacturing apparatus according to claim 13, wherein said upper forming roll mechanism is vertically movable, and said lower forming roll mechanisms are horizontally movable toward and away from a vertical plane along which said upper forming roll mechanism is movable.

15. A curved glass manufacturing apparatus according to claim 13, wherein said roll-forming unit further includes two second lower forming roll mechanisms disposed between said two lower forming roll mechanisms in symmetric relation with each other about a vertical plane passing through the axis of said forming roll of said upper forming roll mechanism, said upper forming roll mechanism is movable along said vertical plane, said two lower forming roll mechanisms are fixed in position, and said two second lower forming roll mechanisms are horizontally movable toward and away from said vertical plane.

16. A curved glass manufacturing apparatus according to claim 1, further including a series of horizontally arranged conveyor roll mechanisms disposed downstream of said roll-forming unit for conveying the curved glass sheet a downstream direction, wherein each of said conveyor roll mechanisms comprises a conveyor roll including a resilient rod and a plurality of work supporting circular disks attached to said resilient rod at intervals along the length of said resilient rod, a pair of support members rotatably supporting opposite end portions of said resilient rod while allowing said resilient rod to tilt about said support members, and at least one bending support members acting on said resilient rod to pull or push said resilient rod in a direction orthogonal to the axis of said resilient rod to flex said resilient rod into a curvature complemental to the desired curvature of the curved glass sheet.

17. A curved glass manufacturing apparatus according to claim 16, wherein said resilient rod is composed of an elongated core member of resilient material, a plurality of resilient strands laid longitudinally on a peripheral surface of said core member in close juxtaposition around said core member, and a helical coil spring wound around said resilient strands to tightly bind together said resilient strands and said core member.

18. A curved glass manufacturing apparatus according to claim 16, wherein said support members each include a fixed housing having a spherical hole, and a spherical segment member pivotally received in said spherical hole and rotatably supporting one of said opposite end portions of said resilient rod.

19. A curved glass manufacturing apparatus according to claim 16, wherein said bending support member includes a horizontal cross member extending between said support members in lateral spaced relation to said conveyor roll, a socket having a spherical hole, a spherical segment member pivotally received in said spherical hole in said socket and having a central hole in which a longitudinal portion of said resilient rod is rotatably received, a screw shaft extending vertically through said cross member and connected at one end to said socket, and first and second nuts threaded with said screw shaft on opposite sides of said cross member.

20. A curved glass manufacturing apparatus according to claim 19, wherein said second nut is located remotely from said socket as compared to said first nut and is a lock nut with handle having a wheel-like handle portion and a nut portion integral with a central portion of said handle portion.

21. A curved glass manufacturing apparatus according to claim 19, wherein said cross member has an oblong hole extending in a direction parallel to the axis of said resilient rod, said screw shaft extending through said oblong hole.

22. A curved glass manufacturing apparatus according to claim 16, wherein said bending support member includes a horizontal cross member extending between said support members in lateral spaced relation to said conveyor roll, a socket having a spherical hole, a spherical segment member pivotally received in said spherical hole in said socket and having a central hole in which a longitudinal portion of said resilient rod is rotatably received, and a turnbuckle interconnecting said socket and said cross member, said turnbuckle including a first screw rod having a left-hand thread and connected at one end to said socket, a second screw rod having a right-hand thread, a stay pivotally connected to said cross member and firmly connected to one end of said second screw, and a sleeve having opposite ends threaded with said left-hand and right-hand threads of said first and second screw rods with the respective other ends of said first and second screw rods facing each other.

23. A curved glass manufacturing apparatus according to claim 22, wherein said cross member has an oblong hole extending in a direction parallel to the axis of said resilient rod, said stay is pivotally connected to said cross member by a pivot pin extending through said oblong hole.

24. A curved glass manufacturing apparatus according to claim 16, wherein said each conveyor roll mechanism further includes a drive source coupled with one end of said resilient rod to rotate said conveyor roll.

25. A curved glass manufacturing apparatus according to claim 16, wherein said conveyor roll mechanisms are arranged in pairs each composed of an upper conveyor roll mechanism and a lower conveyor roll mechanism cooperating with each other to convey the curved glass sheet while gripping the curved glass sheet between respective conveyor rolls of said upper and lower conveyor roll mechanisms.

26. A forming roll mechanism for roll-forming a heated flat glass sheet into a curved glass sheet of a desired curvature, comprising:

a forming roll having a resilient rod covered with a cover member except opposite end portions thereof, a pair of support members rotatably supporting said opposite end portions of said resilient rod while allowing said resilient rod to tilt about said support members, a bending unit coupled with at least one of said opposite end portions of said resilient rod for applying to said at least one end portion an external force tending to flex said forming roll into either an upwardly arched configuration or a downwardly arched configuration, and at least one backup roller unit being in rolling engagement with said forming roll to maintain the arched configuration of said forming roll.

27. A forming roll mechanism according to claim 26, further including a drive source coupled with the end portion of said resilient rod not attached to said bending unit to rotate said forming roll.

28. A forming roll mechanism according to claim 26, wherein said resilient rod is composed of an elongated core member of resilient material, a plurality of resilient strands laid longitudinally on a peripheral surface of said core member in close juxtaposition around said core member, and a helical coil spring wound around said resilient strands to tightly bind together said resilient strands and said core member.

29. A forming roll mechanism according to claim 26, wherein said cover member comprises a seamless tube having a knit structure formed of a glass fiber, ceramic fiber, metal fiber, aramid fiber or the combination thereof.

30. A forming roll mechanism according to claim 26, wherein said cover member comprises a continuous tape wound around said resilient rod and having a woven structure formed of a glass fiber, ceramic fiber, metal fiber, aramid fiber or the combination thereof.

31. A forming roll mechanism according to claim 26, wherein said support members each include a fixed housing having a spherical hole, and a spherical segment member pivotally received in said spherical hole and rotatably supporting one of said opposite end portions of said resilient rod.

32. A forming roll mechanism according to claim 26, wherein said bending unit includes a tubular holder pivotally supported by one of said support members and having an axial blind hole in which said one end portion of said resilient rod is slidably and rotatably received, and an adjustment screw threaded through a closed end of said tubular holder into said axial blind hole and adapted to be turned to displace said one end portion of said resilient rod in an axial inward direction for causing said forming roll to flex in said arched configuration.

33. A forming roll mechanism according to claim 32, wherein said bending unit further includes a compression coil spring and a steel ball received in said axial blind hole of said tubular holder and disposed between said adjustment screw and said one end portion of said resilient rod, a first spring seat disposed between said adjustment screw and one end of said compression coil spring, and a second spring seat disposed between the other end of said compression coil spring and said steel ball.

34. A forming roll mechanism according to claim 33, wherein said compression coil spring has a resiliency greater than that of said resilient rod of said forming roll.

35. A forming roll mechanism according to claim 32, wherein said support members each include a fixed housing having a spherical hole, and a spherical segment member pivotally received in said spherical hole and having a central hole, said tubular holder is firmly fitted in said central hole of said spherical segment member.

36. A forming roll mechanism according to claim 26, wherein said bending unit includes a socket having a spherical hole, a spherical segment member pivotally received in said spherical hole of said socket and having a central hole in which said one end portion of said resilient rod is rotatably received, a fixed support nut having a vertically extending threaded hole, and a screw shaft threaded through said fixed support nut and having an end connected to said socket, said screw shaft being adapted to be turned to move said socket and said spherical segment member in a vertical direction for causing said resilient rod to tilt about said support members.

37. A forming roll mechanism according to claim 26, wherein said backup roller unit includes a roller holder, a pair of support rollers rotatably mounted on said roller holder in symmetric relation to one another about a vertical plane passing through an axis of said forming roll for rolling engagement with a circumferential surface of said forming roll, a fixed support nut having a vertically extending threaded hole, and a screw shaft threaded through said support nut and connected at an end to said roller holder, said screw shaft being adapted to be turned to move said support roller in vertical directions toward and away from said forming roll.

* * * * *